May 2, 1961 R. H. COLWILL 2,982,542
COLLATOR
Filed Nov. 6, 1956 10 Sheets-Sheet 4
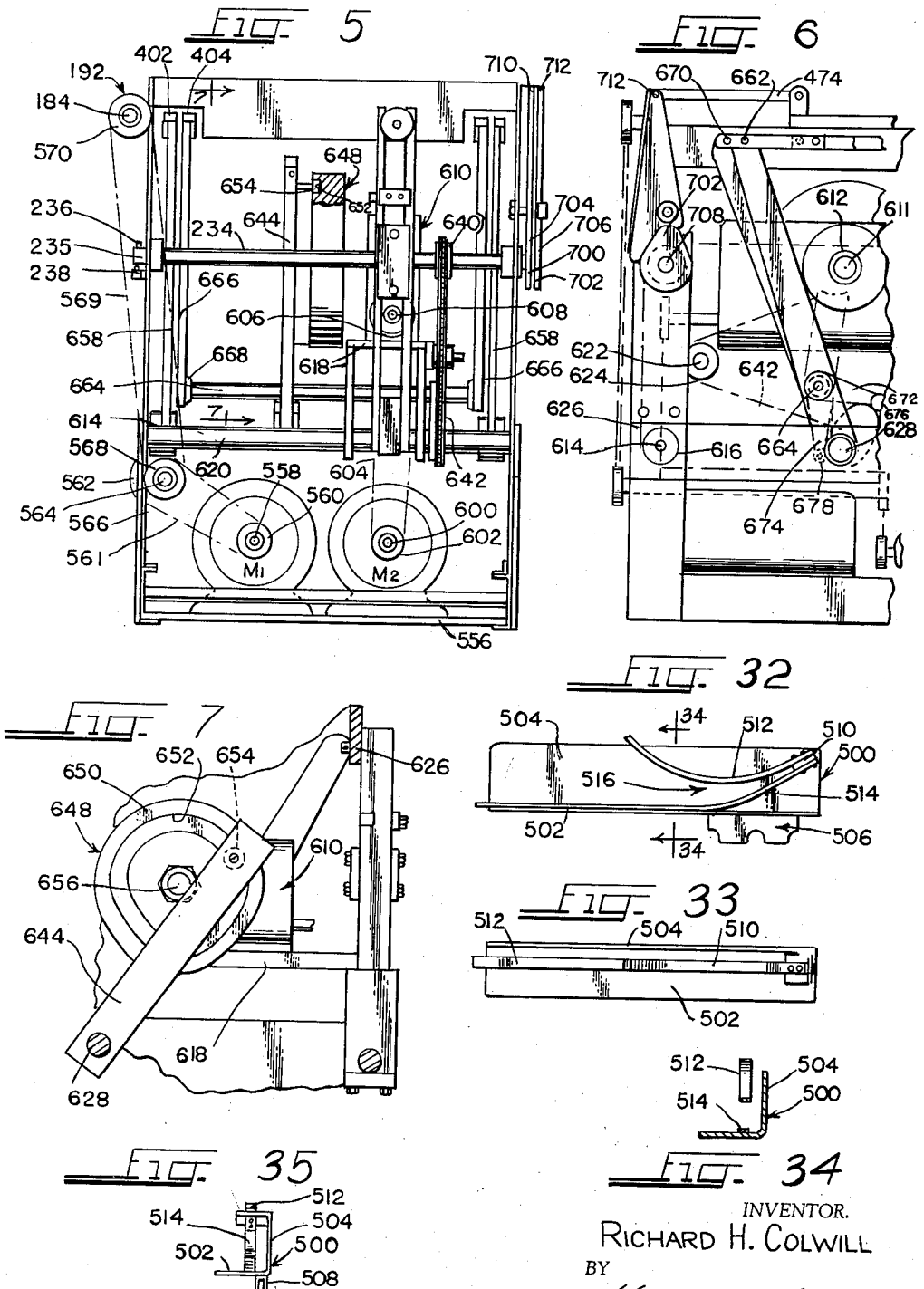
INVENTOR.
RICHARD H. COLWILL
BY
Kegan and Kegan
Attys.

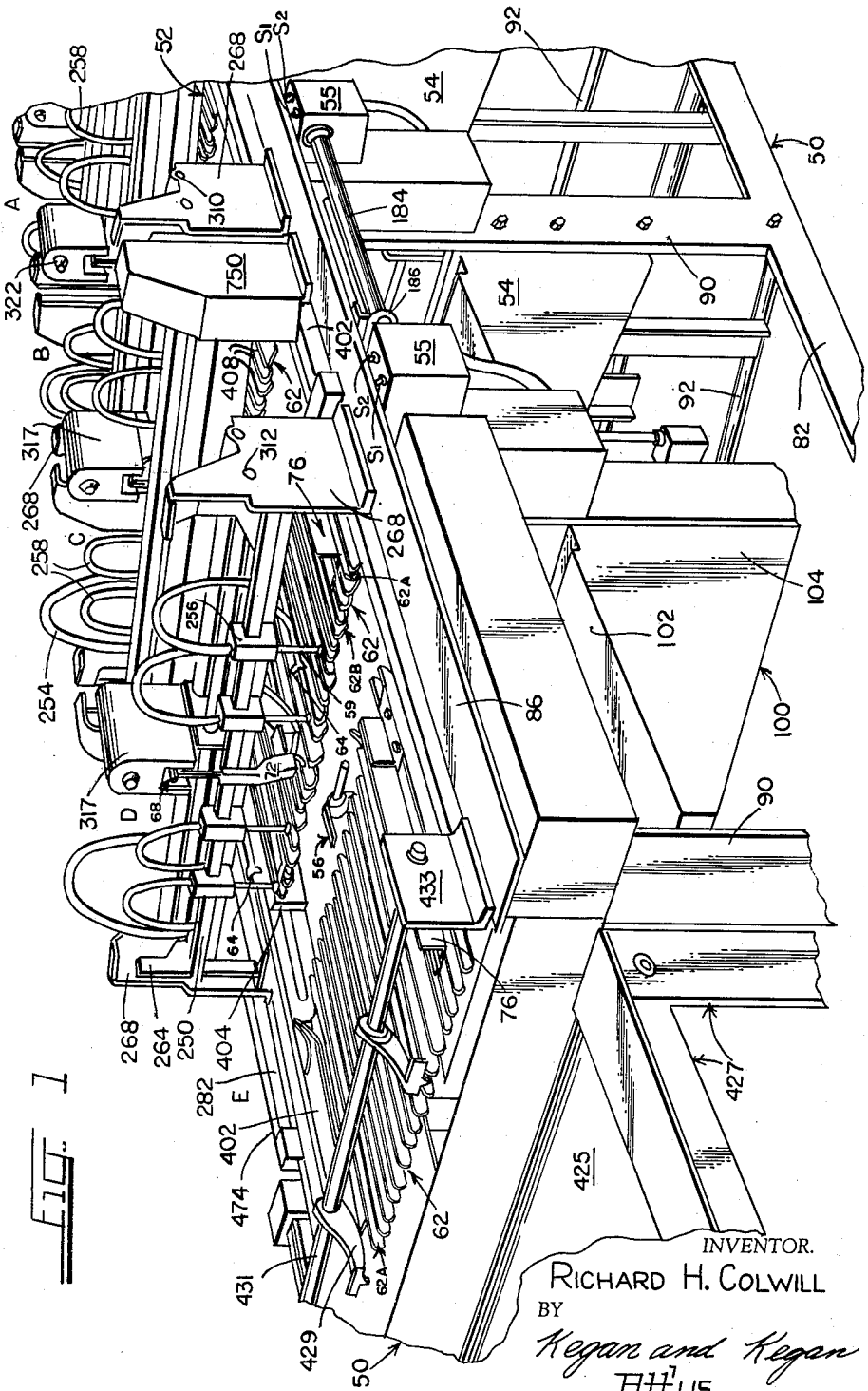

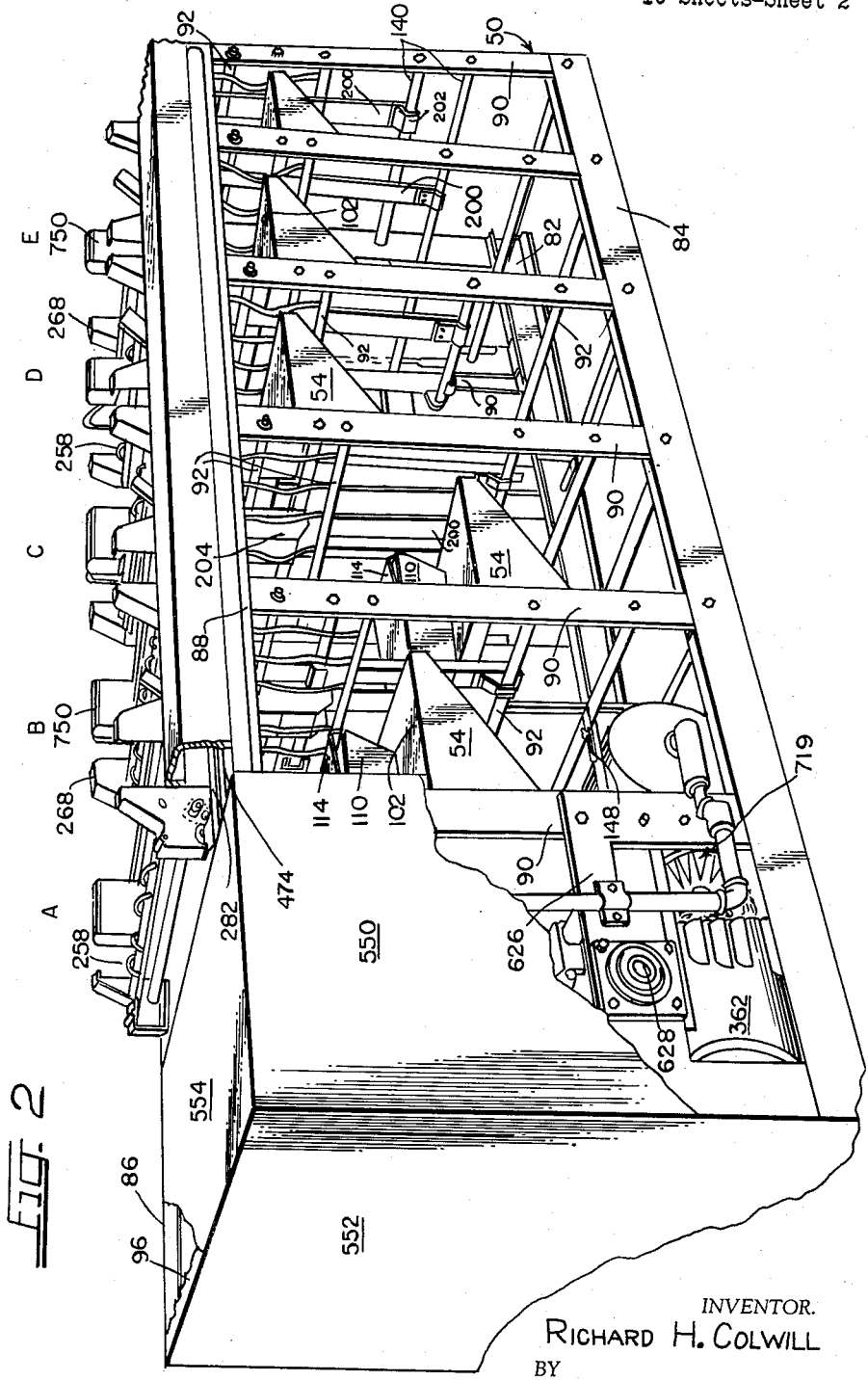

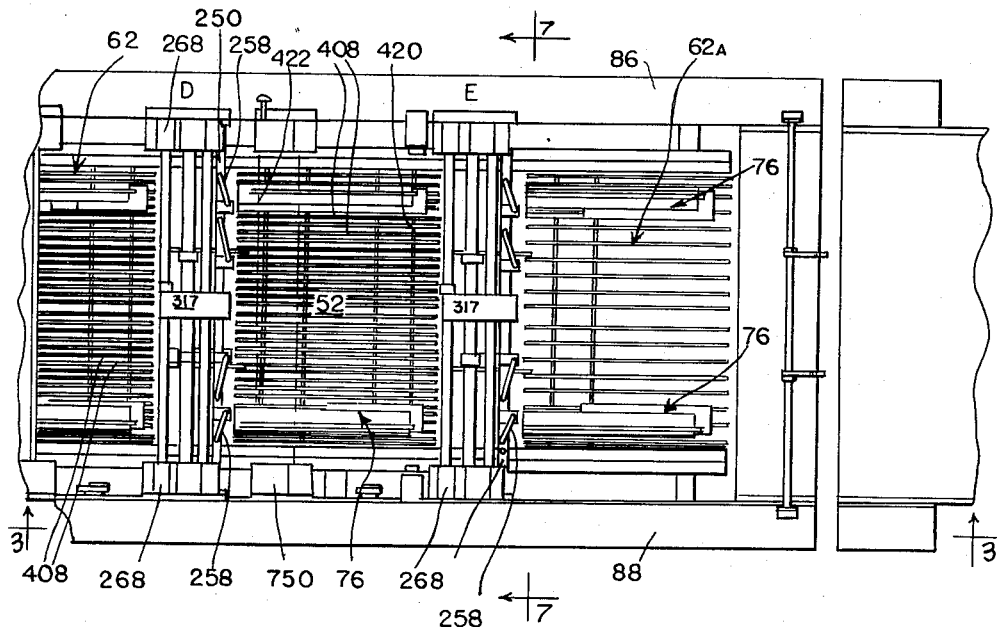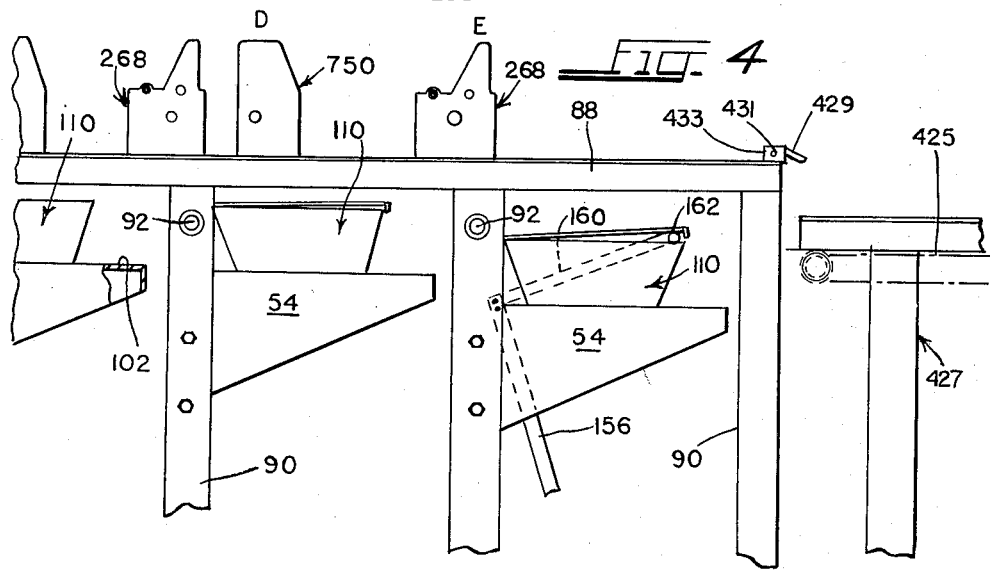

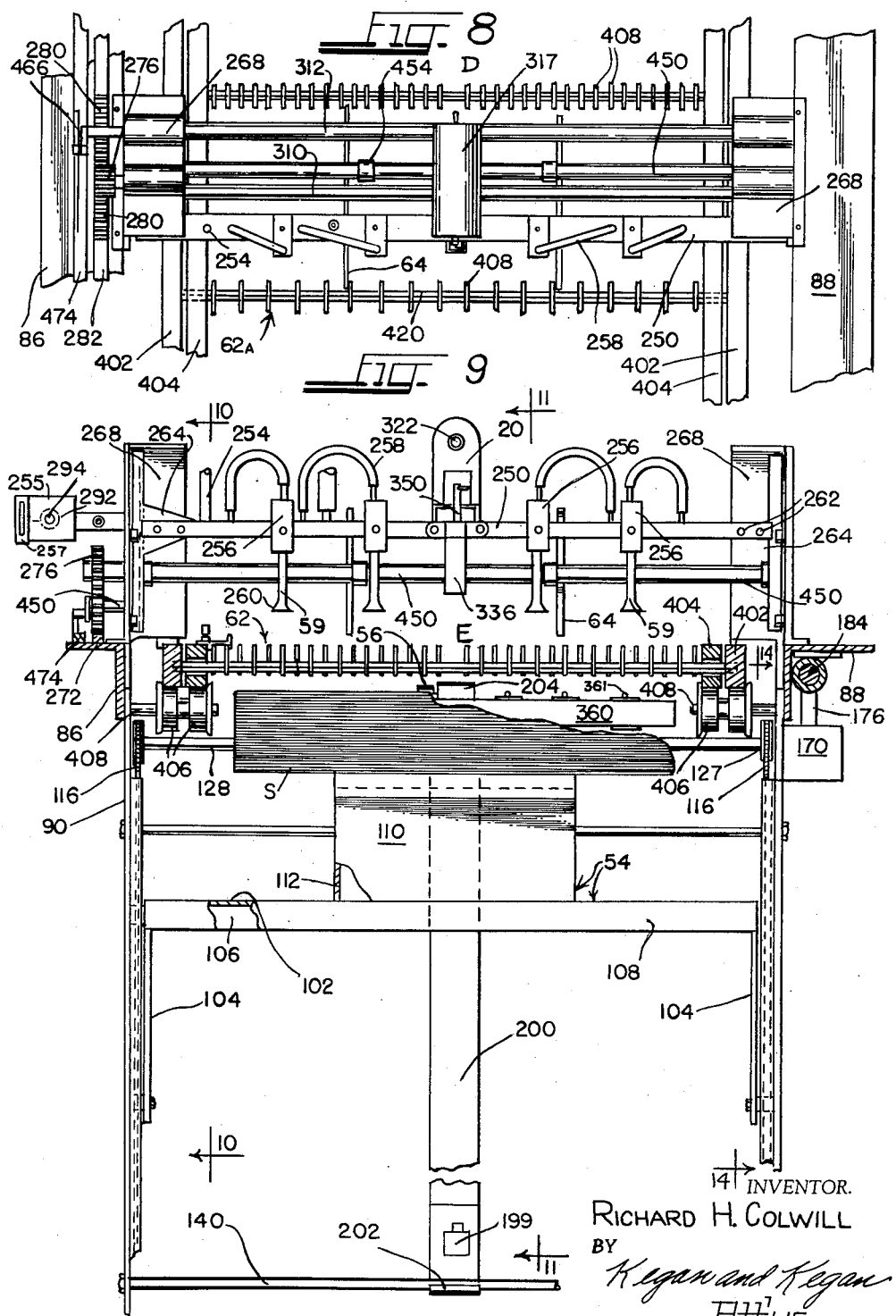

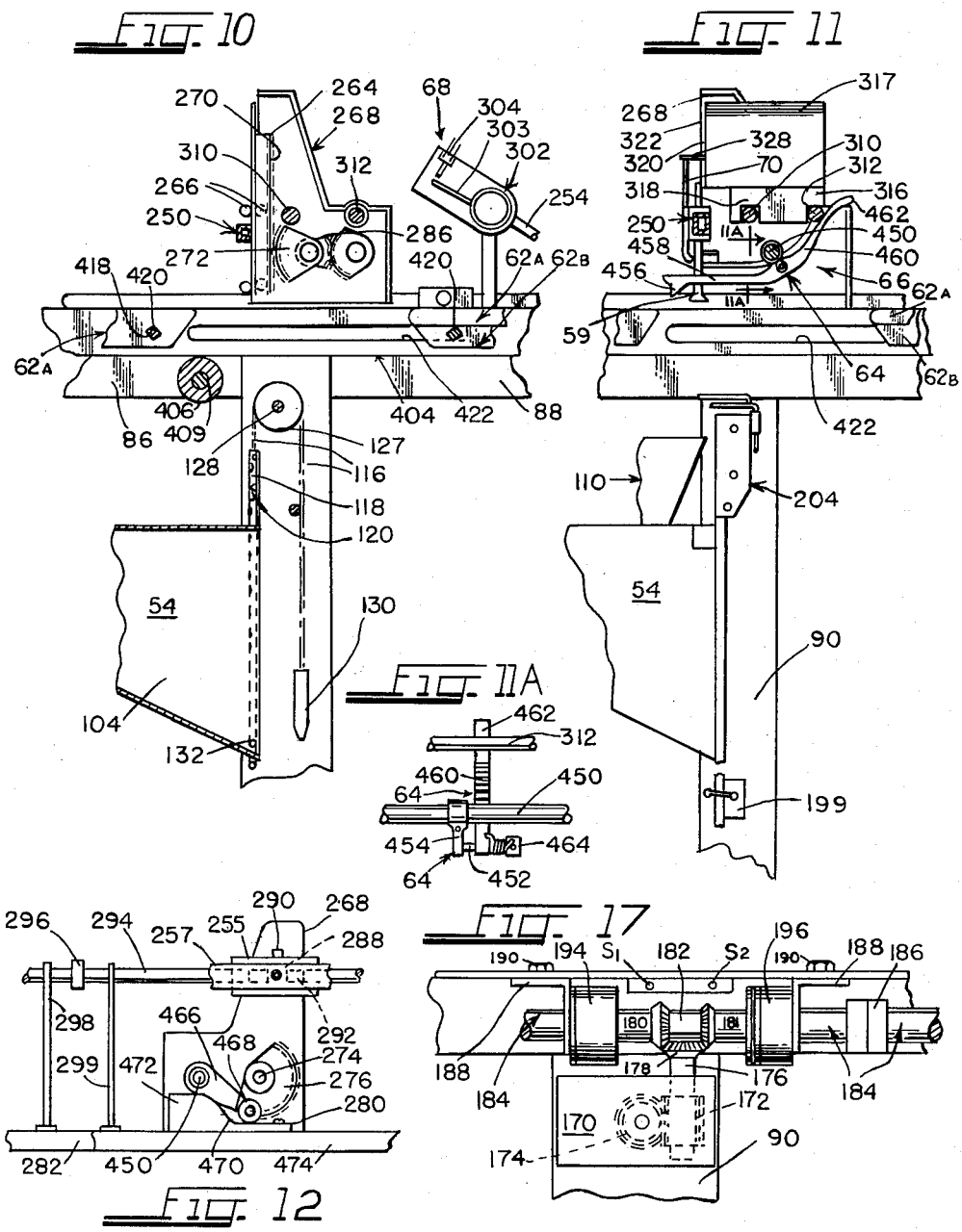

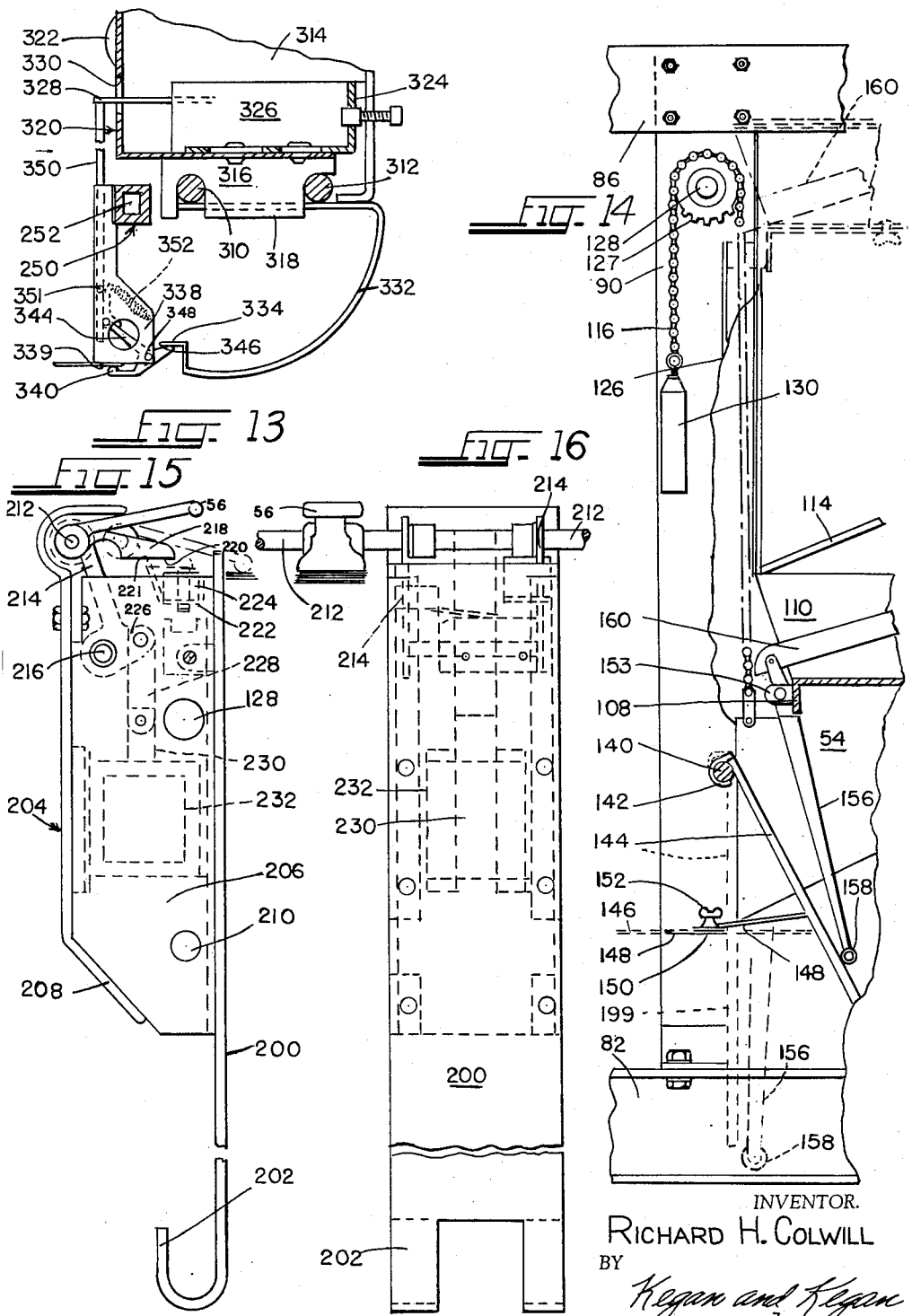

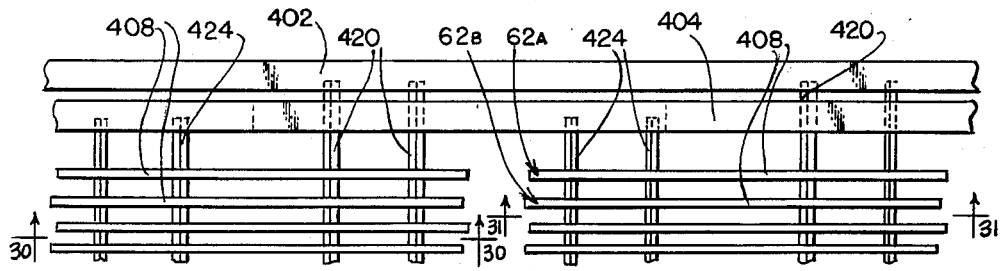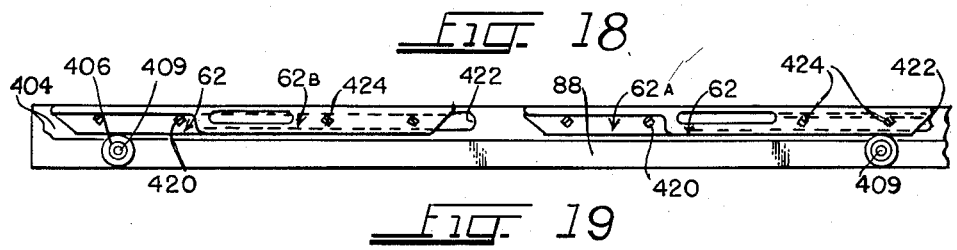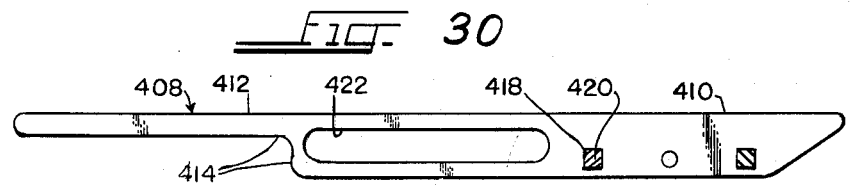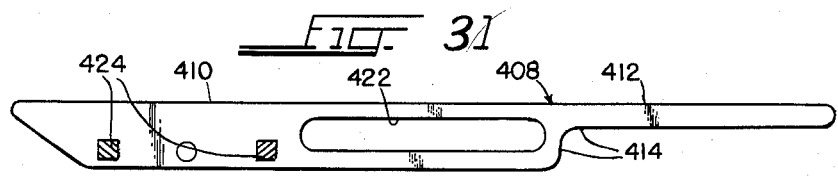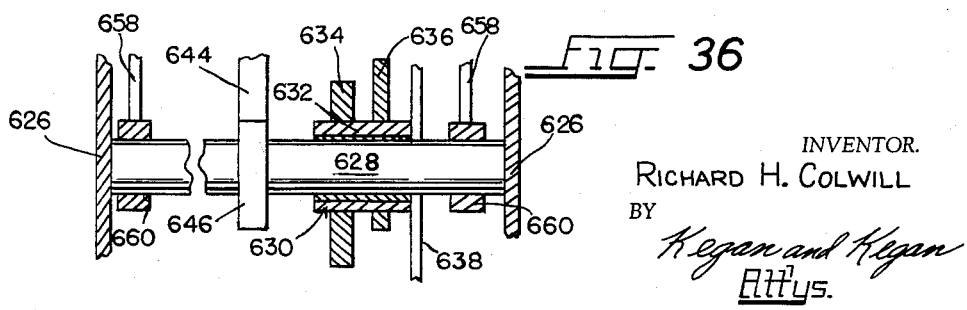

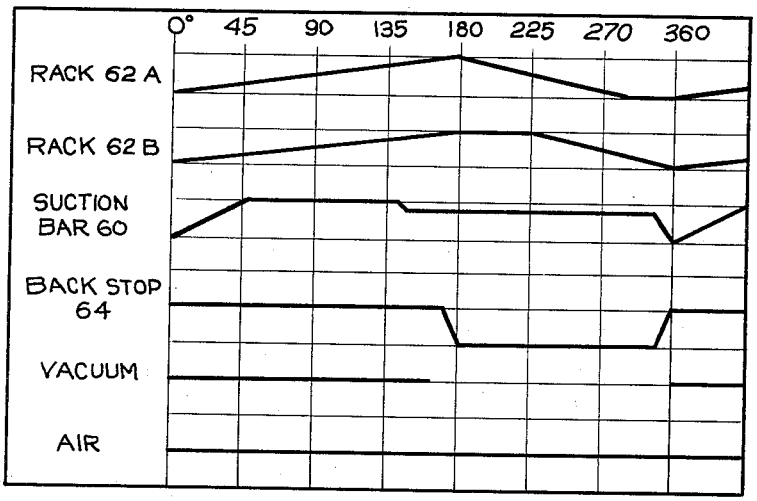
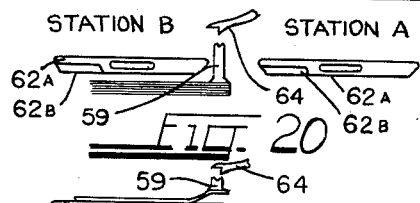
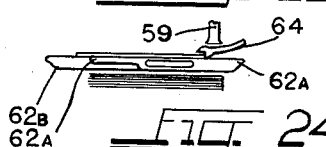
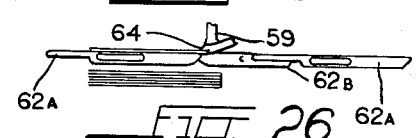
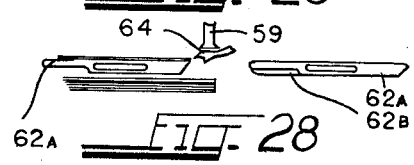
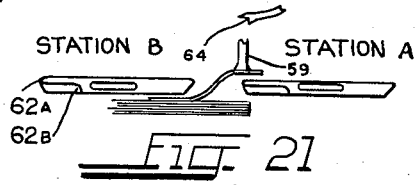
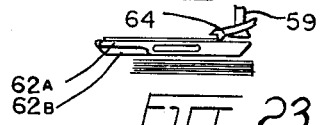
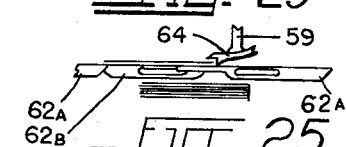
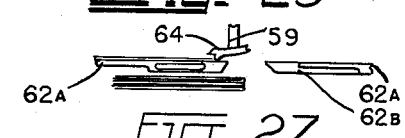
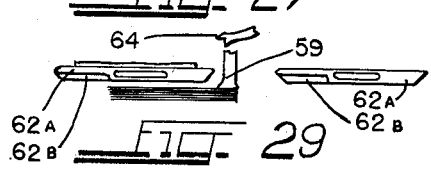
INVENTOR.
RICHARD H. COLWILL
BY
Kegan and Kegan
Attys.

United States Patent Office 2,982,542
Patented May 2, 1961

2,982,542
COLLATOR

Richard H. Colwill, Rochester, N.Y., assignor, by mesne assignments, to Farrington Business Machines Corporation, Needham Heights, Mass., a corporation of Massachusetts Filed Nov. 6, 1956, Ser. No. 620,691

14 Claims. (Cl. 270—58)

The present invention relates to collating machines for assembling a plurality of different paper sheets, such as printed business forms, pamphlet pages and a wide variety of like material from separate stacks thereof into identical groups with the different assembled sheets in predetermined order and register.

It is among the principal objects of the invention to provide a collating machine of this character and of improved design which is fully automatic in its operation and which may be operated continuously at relatively high speed with little or no attention on the part of the operator except for reloading purposes and which, when reloading is required, will enable such operations to be performed while the machine is in full operation without necessitating a shut-down of the machine for the purpose.

A more specific yet equally important object of the invention is to provide such a machine having associated therewith a novel form of sheet pick-off, transfer and gathering mechanism whereby the sheets are withdrawn from the various stacks of sheets periodically and in unison and thereafter deposited on a gathering deck in register with other sheets previously deposited thereon, and the thus registered sheets impelled in a single forward direction along the gathering deck toward a point of discharge, the impelling means being characterized by the absence of endless chain or belt type conveyors, drum conveyors or other similar constantly moving impelling devices the movements of which are difficult to synchronize with accuracy and which, for the purpose intended, require intermittent operation and periodic sliding contact with the paper sheets supported thereon.

In carrying out the above mentioned principal objects, briefly the invention contemplates a cyclicly operable machine having issociated therewith a plurality of sequentially arranged and aligned operating stations, the operating instrumentalities at each station being substantially identical and these instrumentalities performing their functions at the various stations in unison respectively. At each station there is provided means for receiving a stack of the papers or sheets to be collated together with power driven means for moving the stack vertically upwardly to bring the uppermost sheet thereon into close proximity with a gathering deck thereabove for subsequent transfer to the deck. A sheet pick-off and deposit mechanism is provided utilizing suction means for engaging and elevating an edge only of the uppermost sheet in the stack and maintaining the same elevated above the level of the gathering deck for a predetermined duration in the machine cycle while at the same time a previously deposited sheet or pile of sheets on the gathering deck is slid or tucked in, so to speak beneath the partially elevated sheet and the force of the oncoming sheet or pile of sheets is utilized to progressively raise the remaining unelevated portion of the partially elevated sheet and, by a camming action on the sheet, bring the same to the level of the gathering deck. Immediately thereafter, the suction means is released and the sheet deposited on the previously deposited sheet or pile of sheets and transfer operations take place to shift each thus gathered pile to the next station in the series where the operations just described are repeated by the operating instrumentalities at that station during the ensuing cycle. The various gathered piles of sheets are thus shifted from station to station in the direction of discharge with an additional sheet being added to each pile as it enters each station.

It is a further object of the invention, in a machine of this character to provide a novel means for manually controlling the vertical movements of the stack-receiving means whereby the stack may selectively be moved in an upward or a downward direction to facilitate loading of the machine with fresh stack of paper sheets. A similar and related object is to provide a stack movement control mechanism which may be set for automatic operation and which, when thus set, will cause small increments of upward vertical motion to be applied to the stack commensurate with the demand for sheets at the gathering deck so as to feed the stack upwardly and maintain the uppermost sheet thereon in proper register with the pick-off and deposit mechanism by means of which the sheets are removed from the stack and placed on the gathering deck. In carrying out this last mentioned object, the invention contemplates the use of a novel form of sensing mechanism which operates to sense the level of the uppermost sheet in the stack at the commencement of each machine cycle, together with novel clutch-operated means operable under the control of the sensing mechanism for effecting the necessary stack feeding operations.

Yet another object of the invention is to provide a machine of the type briefly outlined above having associated therewith a novel form of detecting mechanism which operates, when the pick-off and deposit mechanism fails to engage a sheet at the top of the stack, to stop the operation of the machine while at the same time rendering a visible signal which is indicative of the particular station where the operational failure occured to facilitate remedial action by the operator of the machine.

A still further object of the invention is to provide such a machine which embodies a novel means for detecting the presence of plural sheets or "doubles" which may be fed to the pick-off and deposit mechanism, such detecting means involving the use of a calipering device for measuring the thickness of paper fed from the stack at each machine cycle and by means of which the operation of the machine is terminated and a signal light energized when such doubles exist at any one of the operating stations.

A further and important object of the invention in a machine of this sort is the provision of a novel form of reciprocating transfer and gathering mechanism for effecting transfer of the sheets from station to station in a forward direction, such mechanism involving the use of cooperating pairs of racks or paper supports which are caused to reciprocate in a common horizontal plane and which, by virtue of their existence in a common plane collectively constitute the gathering deck, the relative reciprocation imparted to the various pairs of supports, and to the individual supports of each pair, being such that the paper sheets carried thereon will at all times find full and adequate support on the gathering deck with no underlying voids being created and consequently with no localized sagging of the paper sheets. A similar and related object of the invention is to provide a machine wherein such reciprocating pairs of racks, in combination with a movable back stop device, insures forward motion of the paper sheets only to the exclusion of any reverse movement thereof.

It is another object of the invention to provide a rack structure of the character set forth above having rack bars which are interlaced with each other.

It is another object of the invention to provide a rack structure of the character set forth above in which the cooperating racks of each pair are comprised of rack bars which are interlaced with each other in alternate fashion with each rack bar of both racks being of identical construction and design with the bars of one rack of each pair having a reverse orientation with respect to the bars of the other rack in the pair whereby the supporting means for all of the rack bars may have the necessary full relative reciprocating motion for proper rack movement without mutual interference. By such an arrangement, economy of manufacture due to uniformity of parts is also facilitated.

The objects of the invention are manifold and still another object is to provide a novel form of paper flattening guide means whereby the paper in its travel along the gathering deck, at each station therealong, is maintained in a flat condition against elevation due to certain riffling mechanism employed in connection with the invention, and against curling along the longitudinal marginal edges thereof.

The provision of a collating machine which is highly efficient in its operation; one which, considering its complexity, has been reduced in the number of moving parts thereof and which therefore is unlikely to get out of order; one which is rugged and durable and which therefore is possessed of a long life; one which may be constructed in the main, and particularly as regards its framework and supporting structure, from standard types of metal stock such as sheet metal, rod or tube stock, channel stock, angle stock, etc., and which therefore may be manufactured at a low cost; one which is self-contained and which may be operated from a single source of electric current supply and which therefore does not require the use of external sources of compressed or sub-atmospheric air or the like; one which is attractive in its appearance and pleasing in its design, and one which otherwise is well adapted to perform the services required of it, are further desirable features which have been borne in mind in the production and development of the present invention.

Other objects and advantages of the invention, not at this time enumerated, will become more readily apparent as the nature of the invention is better understood.

In the accompanying ten sheets of drawings forming a part of this specification, a preferred embodiment of the invention has been shown.

In these drawings:

Fig. 1 is a front perspective view of a collating machine constructed in accordance with the principles of the present invention.

Fig. 2 is a back perspective view of the machine shown in Fig. 1.

Fig. 3 is a fragmentary top plan view of a portion of the machine adjacent the rear end thereof.

Fig. 4 is a side elevational view of the structure shown in Fig. 3.

Fig. 5 is a rear end view of the machine.

Fig. 6 is a fragmentary side elevational view of the structure shown in Fig. 5.

Fig. 7 is a sectional view taken substantially along the line 7—7 of Fig. 6.

Fig. 8 is a fragmentary top plan view of a portion of the machine and illustrating certain sheet elevating and depositing mechanism employed in connection with the present invention.

Fig. 9 is a side elevational view of the structure shown in Fig. 8.

Fig. 10 is a sectional view taken substantially along the line 10—10 of Fig. 9.

Fig. 11 is a sectional view taken substantially along the line 11—11 of Fig. 10.

Fig. 11A is a sectional view taken substantially along the line 11A—11A of Fig. 11.

Fig. 12 is a detail fragmentary view of certain back stop operating mechanism employed in connection with the invention.

Fig. 13 is a detail fragmentary side elevational view of a paper thickness gauging mechanism employed in connection with the invention.

Fig. 14 is a sectional view taken substantially along the line 14—14 of Fig. 9.

Fig. 15 is a side elevational view of a stack level sensing mechanism employed in connection with the invention.

Fig. 16 is a front view of the stack level sensing mechanism shown in Fig. 15.

Fig. 17 is a fragmentary detail side elevational view of a selective clutch mechanism employed in connection with the invention.

Fig. 18 is a fragmentary top plan view of a portion of the machine looking down upon the gathering deck in the vicinity of adjacent stations and showing a composite reciprocating rack construction employed in connection with the invention.

Fig. 19 is a side elevational view of the structure shown in Fig. 18.

Figure 38:
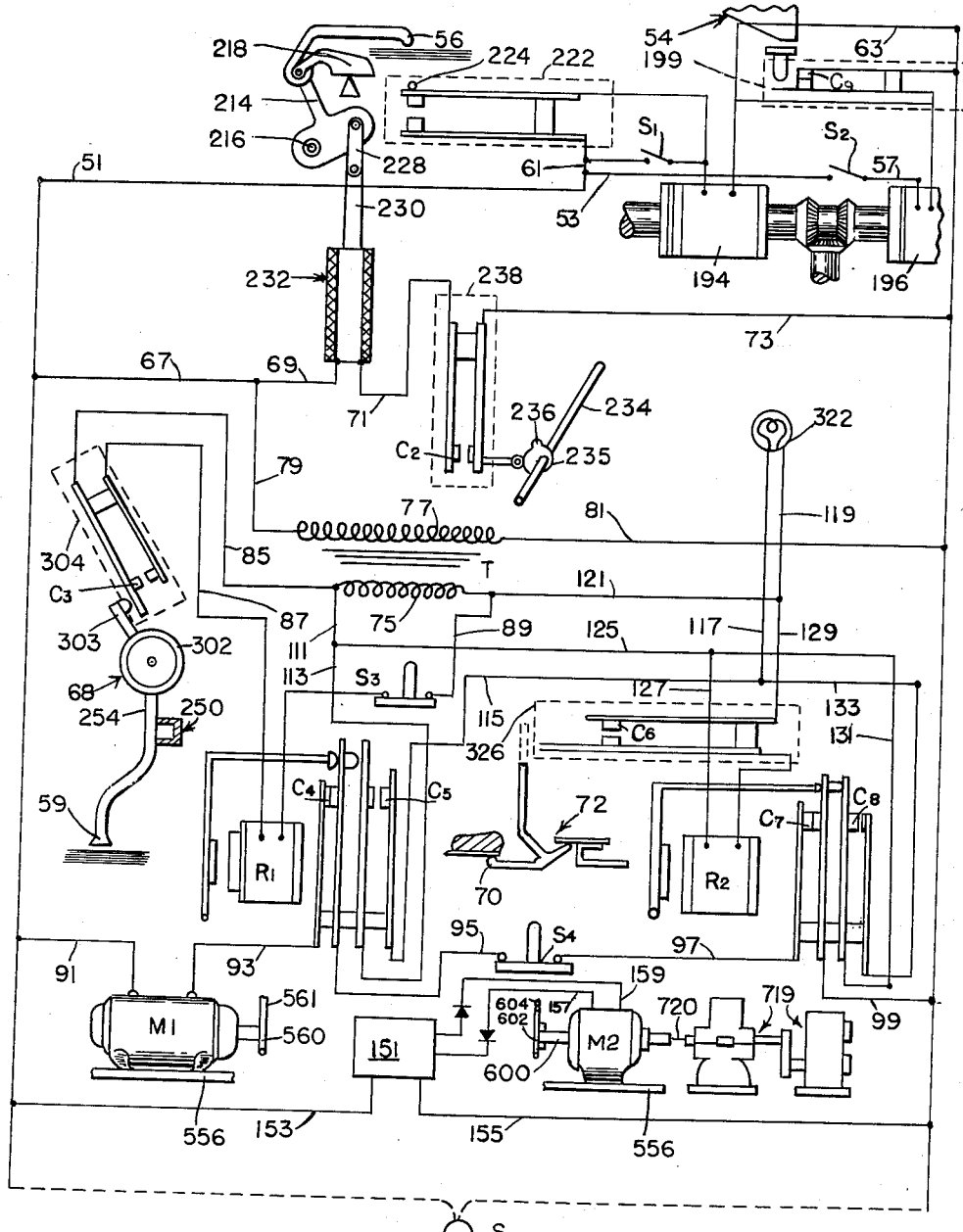

Figs. 20 to 29 inclusive are schematic views showing the composite rack constructions and certain other operating instrumentalities in various positions which they assume during transfer of a sheet or pile of sheets from one station to the next succeeding station. These views represent substantially one full machine cycle.

Fig. 30 is a sectional view taken substantially along the line 30—30 of Fig. 18.

Fig. 31 is a sectional view taken substantially along the line 31—31 of Fig. 18.

Fig. 32 is a side elevational view of a paper guide assembly employed in connection with the invention.

Fig. 33 is a top plan view of the structure shown in Fig. 32.

Fig. 34 is a sectional view taken substantially along the line 34—34 of Fig. 31.

Fig. 35 is an end elevational view of the paper guide assembly of Fig. 32.

Fig. 36 is an enlarged sectional view taken substantially along the line 36—36 of Fig. 6.

Fig. 37 is a timing chart showing the operation of various machine instrumentalities, and Fig. 38 is a wiring diagram of the machine.

BRIEF DESCRIPTION

Referring now to the drawings, and in particular to Fig. 1, briefly, the collating machine comprising the present invention is of a cyclicly operable nature and involves in its general organization a stationary framework 50 within or upon which all of the operative parts of the machine are mounted. The framework 50 presents an upper working surface or table top along which the paper sheets undergoing gathering are propelled, this surface being designated in its entirety at 52 (see also Figs. 7 and 8) and being referred to hereinafter as the gathering deck. The direction of paper feed along the gathering deck 52 is from right to left as viewed in Fig. 1 and therefore the right hand end of the machine will be regarded as the rear end from which paper is fed forwardly and to the left. The operator of the machine will stand on the front side therof as viewed in Fig. 1, this view being a front perspective view of the machine. Thus, to preserve consistency of description and terminology throughout this specification, and in the claims, the ends of the machine will be termed "rear" and "forward" as relating to the direction of paper feed and as distinguished from the "front" and "back" sides of the machine as relating to the operator's position when loading or otherwise attending to the machine.

As been seen in Figs. 1 and 2, the machine is comprised of a plurality of substantially identical operating stations, five such stations being shown herein for illustrative purposes although, of course, a greater or lesser number of stations may be employed according to the desired machine capacity. The five stations have been designated in Figs. 1 and 2 at A, B, C, D and E, reading from the rear end of the machine toward the forward end thereof. The framework 50 is, in the main, comprised of structural steel members such as channel members, angle members, flat bars of strip stock, rod stock and the like, secured together as will be described subsequently to provide an open-sided structure giving access to the various operating stations A, B, C, etc. for selective loading thereof through the open side of the framework. Each of the five stations is provided with a vertically movable loading and feeding platform assembly 54 adapted to receive thereon the stacked sheets, one such stack of sheets being shown in Fig. 9 and being designated at S, and selectively operable clutch means shown at 55 and which forms the subject matter of Fig. 17 are provided for controlling the vertical movements of the assembly in either direction.

For loading purposes, the clutch-operated means 55 may be manually controlled, while for paper feeding purposes wherein the stack is fed upwardly toward the gathering deck above the platform assembly, the clutch-operated means is automatic and cyclic in that a moving sensing finger 56 associated with a set of sensing instrumentalities (Fig. 15) is caused periodically, i.e., once during each machine cycle, to sense the level or elevation of the uppermost sheet in the stack and, when such level falls below a predetermined minimum, the clutch-operated means is automatically set into operation to raise the level of the stack by imparting to the platform assembly 54 a small increment of upward motion, regardless of the instant position of the assembly. Additional automatically operable means in the form of a stack tilting assembly 57 (Fig. 14) is provided for imparting progressive degrees of inclination to the stack during upward feeding thereof to maintain the uppermost sheet thereon in a horizontal position and compensate for the cumulative effect of prepared sheets having top marginal strips or which otherwise may be of uneven thickness.

At each of the various operating stations and immediately above the gathering deck 52 means are provided for periodically elevating the uppermost sheet of paper in each stack and for transferring the same from the stack to the gathering deck immediately above the stack for subsequent gathering operations at spaced regions on the deck by transfer of the sheet bodily from station to station along the deck for assembly with succeeding sheets delivered at the various stations. As previously stated, the machine is cyclic in its operation and for purposes of description herein, a machine cycle may be considered as the repetitive machine operations which take place between successive paper transfer operations wherein successive sheets are elevated from the stack and deposited on the gathering deck. The operations of the various instrumentalities at each station are in phase with one another and thus the feeding of the sheets upwardly to the gathering deck at the various stations, as well as the transfer of the sheets from each station to the next succeeding station along the gathering deck takes place simultaneously.

The means for periodically feeding the uppermost sheet in each stack to the gathering deck comprises sheet pick-off and deposit mechanism including a set of suction devices 59 (Fig. 9) mounted on what is termed herein as a suction bar assembly 60 and which suction devices normally are disposed above the level of the gathering deck 52 but are adapted at the commencement of each machine cycle to descend and engage the uppermost sheet in the stack and immediately thereafter to ascend and elevate the rear edge of the sheet above the level of the deck so that one of the rack assemblies associated with the reciprocating transfer mechanism, which in itself constitutes a portion of the gathering deck, may be caused to slide under the partially elevated sheet, so to speak, and progressively force the sheet to its normal horizontal position of rest on the gathering deck, or on previously deposited gathered sheets carried thereby.

The reciprocating transfer mechanism mentioned above is in the form of a plurality of pairs of cooperating reciprocating racks, the individual pairs being designated at 62 (Figs. 18, 19, 30 and 31) and the individual racks of each pair being designated at 62a and 62b respectively. The racks 62a and 62b are of an interlacing type and each station has associated therewith one of the pairs of racks 62. The racks 62a and 62b at each station are reciprocable in timed relation to each other, with the motion of the respective racks at all of the stations being identical both as to amplitude and direction. The motion of the various racks, in combination with certain paper-engaging reaction members or back-stops 64 associated with respective back-stop assemblies or mechanisms 66 (Fig. 11), is so designed that periodic forward impelling movement is applied to each sheet fed to the gathering deck 52 with each pair of rack elements cooperating with each adjacent pair, both forwardly and rearwardly thereof, so that the paper at all times finds adequate support on the gathering deck and is constrained to have only increments of forward motion or of paper dwell, to the exclusion of any rearward motion. As each sheet is fed to the gathering deck 52 at its respective station, the trailing end or edge thereof is lifted by the suction feed mechanism in advance of and above the level of the leading edge or edges of oncoming sheets or piles on the gathering deck and the sheet or pile is forced beneath the elevated trailing edge of the sheet. By such an arrangement, the gathering operations which the present machine is intended to perform are accomplished with the size of the gather being increased by one sheet as the gathered pile of sheets pass each station.

In order to insure that proper unit feeding of the stacked sheets on each feed platform assembly 54, to the exclusion of both "voids" and plural feeding of sheets or "doubles," each suction feeding device has associated therewith a pneumatically controlled and relay actuated detecting mechanism designated in its entirety at 68 in Fig. 10 whereby, when the suction feeding means fails to properly engage and capture the uppermost sheet on the stack, the electric circuit for the motor which drives the reciprocating transfer mechanism is opened to thereby terminate machine operations while at the same time selective signal means are energized to give an indication of the particular station where the trouble has occurred. Likewise, in the event that the suction feeding mechanism 59 delivers plural sheets to the gathering deck 52, this contingency sometimes taking place due to mechanical bonding of adjacent sheets or to generated static electricity in the stack, sensing or calipering element 70 associated with a paper thickness measuring mechanism 72 at each station, detects the excess thickness of the paper undergoing feeding and actuates certain relay mechanism which terminates the operation of the machine. When so-called "doubles" are thus detected, provision is also made for illuminating a signal lamp at the particular station where the trouble has occurred.

To assist the suction feeding devices at each station in properly engaging the top sheet in the stack and to minimize the danger of voids or doubles as previously described, aerating mechanism 360, 361 (Fig. 9) in the form of a series of directional air jet orifices is caused to blow a constant stream of air against the rear edges of the uppermost sheets in each stack on its respective loading platform 54 to "fluff" or "riffle" the sheets, so to speak and partially separate them immediately prior to their engagement by the suction devices 59.

A set of flattening instrumentalities in the form of paper guides designated in their entirety at 76 (Figs. 32 to 35 inclusive) assist the action of gravity in causing each sheet which is applied to the gathered pile at each station in resting squarely on the pile, as well as to hold the pile firmly on the gathering deck 364 against any influence such as the aerating mechanism 74 or the like tending to elevate the sheets or curl the edges thereof.

The rear end of the machine (Fig. 2) is adapted to house the driving instrumentalities for the machine including the motor $M_1$ which drives the various reciprocating transfer mechanisms and serves other machine functions; an auxiliary motor $M_2$ which serves the clutch-controlled platform operating mechanism 55; an air compressor (not shown) used for aerating purposes, and other auxiliary equipment, as well as certain cam-operated driving mechanisms, the nature and function of which will be made clear as the following description ensues.

THE MACHINE FRAMEWORK

Referring now to Figs. 1 and 2, the machine framework 50 includes a pair of longitudinally extending base side rails 82 and 84 of channel design and a pair of upper side rails 86 and 88 of angle configuration (see also Fig. 8), the upper and lower rails on each side of the machine being connected together by vertical side members 90, there being seven such vertical members on each side of the machine in the present illustrated embodiment of the invention. The various pairs of transversely aligned vertical side members 90 are connected together by transverse rods 92 at various elevations and some of the rods 92 perform special supporting functions in the machine operation as will be described presently. At the opposite ends of the machine, the upper side rails 86 and 88 are connected together by end rails 94 and 96 respectively. The various frame members described above define the general machine contour and are the principal frame elements. Additional frame members or elements in the form of horizontal longitudinal or transverse, and vertical auxiliary members such as struts, webs, tie rods, suspension or other brackets and the like are included in the general machine framework 50 and will be described individually and specifically as the need arises throughout this specification.

The machine illustrated herein is a five station machine, which is to say that the paper sheets are fed from six individual paper stacks to the gathering deck 52 at six spaced regions along the machine framework. The first six pairs of transversely opposed spaced vertical side members 90, reading from right to left in Fig. 1, roughly define therebetween the five operating stations of the machine, these stations for descriptive purposes being labelled A, B, C, D and E respectively. The various mechanisms at each of the five stations roughly defined by the vertical frame members 90 and including the stack receiving and feeding mechanism, the sheet pick-off and deposit mechanism, the reciprocating transfer and gathering mechanism, and many of the machine operating instrumentalities, are identical in their design and function and therefore it is though that a description of one such set of mechanism will suffice for the others.

THE STACK RECEIVING AND FEEDING MECHANISM

The platform assemblies

Referring now to Figs. 1, 2, 4, 9, 10 and 11, each stack is adapted to be supported on one of the vertically movable platform assemblies 54, which assemblies each include a lower tray support 100 which is in the form of a sheet metal structure including a horizontal supporting plate 102 from which there depend a pair of generally triangular side walls 104 and narrow transverse front and rear flanges 106 and 108 respectively. Mounted on each plate 102 is a paper supporting tray assembly 110 including side members 112 which are bolted or otherwise secured to the plate 102. Pivotally secured to the rear ends of the side members 112 is a tray proper 114 in the form of a flat plate, the inclination of which is adapted to be varied to accommodate the variation in horizontal taper of paper sheet stacks of different thicknesses which may be placed upon the plate 114, such variation being due to the cumulative effect of the increased thickness of individual prepared sheets along the rear edge thereof when marginal strips are applied thereto. By varying the inclination of the tray 114, it is possible to maintain the uppermost sheet in the stack substantially horizontal so that it may be properly presented to the pick-off mechanism for deposition on the gathering deck as will be described subsequently.

Each platform assembly 54 is guided in vertical guideways (not shown) for movement vertically between extreme lower and upper positions and means are provided for manually controlling such vertical movements of the platform when occasion demands, as for example for loading purposes. Additionally, means are provided for causing automatic and periodic upward feeding movements of the platform through small increments of motion to satisfy the requirements of the pick-off mechanism thereabove. Accordingly, each platform assembly 54 is supported on or suspended from a pair of chain hoists, each of which is in the form of a short chain length 116 (Figs. 9 and 10) which may be severed from sprocket type chain stock. Each chain length 116 has one end thereof secured to the upper end of a link 118 the lower end of which is connected to an upper pin and roller 120 slidably disposed in a noted guideway. Each chain length 116 passes over a sprocket 127 (Figs. 9, 10 and 14) and the two sprockets 127 are mounted adjacent the opposite ends of a transverse shaft 128 rotatably journalled in the transversely opposed side members 90. A weight 130 is attached to the free end of each chain length 116 to maintain traction of the chain on its respective sprocket. The lower end of each side wall 104 carries a second pin and roller arrangement 132 slidable in the noted guideway.

The stack tilting mechanisms

Referring now to Fig. 14 wherein the stack tilting mechanism is best illustrated, a transverse rod 140 extends between each pair of opposed vertical side members 90 at each station and pivotally mounted on each rod 140 by means of a U-shaped cap member 142 is an adjustable guide track bar 144 which is angularly adjustable between a retracted vertical position as shown in dotted lines and and an extended position shown in full lines. Means are provided for clamping the track bar 144 in any desired position of adjustment between its two extreme positions and, toward this end, a bracket 146 which is slotted as at 148 projects laterally rearwardly from the medial regions of the bar 144 and is capable of being clamped to the medial region of a tie rod 150 which extends between the side members 90. A wing nut and bolt assembly 152 which passes through the slot 148 facilitates the clamping action.

Pivoted to a bracket 153 mounted medially on the rear depending flange 108 of the tray support 100 is a follower bar 156 which carries a track follower roller 158 at its lower end, the roller being adapted to ride upon the inclined surface of the track member 144 in any of its extended positions of adjustment. The extreme upper end of the follower bar 156 is secured as at 158 to a lift bar 160 which is movable bodily with the follower bar 156 from a retracted position wherein it is out of engagement with the underneath side of the tray proper 114 to various advanced positions wherein the upper end of the bar 160, through the medium of a roller 162 (Fig. 4), engages the underneath side of the tray 114 and, by a camming action, lifts the forward edge regions of the tray to cause the tray to assume an inclined position with respect to the horizontal.

From the above description it will be seen that when the bracket 148 is clamped by the nut and bolt assembly 152 in a position wherein the guide track bar 144 is advanced, as for example in the illustrated full line position thereof shown in Fig. 14, each increment of upward motion applied to the tray assembly 54 as a whole will cause the roller 158 to ride upwardly on the bar 144 and, in so moving, the follower bar 156 is moved throughout an increment of motion closer toward its vertical position. Since the lifter bar 160 is movable bodily with the follower bar 156, such movement of the latter bar toward its vertical position will gradually bring the lifter bar 160 to its retracted position wherein the tray support 114 is moved to its horizontal position. The inclination of the track bar 144 will, of course, be adjusted according to the variation in thickness of the individual sheets of the stack. Where the sheets are all of uniform thickness so that the stack of sheets is precisely rectangular, the track bar 144 will be adjusted to its vertical position as shown in dotted lines in Fig. 14 so that the follower bar 156 will likewise remain vertical throughout its range of movements.

The stack elevating and lowering mechanism

As previously stated, means are provided for manually controlling the vertical movements of the platform assembly 54 in either direction while automatic means operable under the control of the stack level sensing finger or arm 56 (Figs. 1, 15, 16), which periodically senses the level of the uppermost sheet in the stack, are employed for regulably controlling the upward vertical movements of the assembly so that during each machine cycle the picker mechanism will encounter the topmost sheet at the same predetermined level for proper engagement thereby and proper elevation by the mechanism and deposition on the gathering deck 52. Accordingly, the shaft 128 projects through the front side rail 90 (Fig. 9) and extends into a gear reduction device designated in its entirety at 170 (see also Fig. 17) and is operatively connected through a worm 172 and worm gear 174 to a vertical input shaft 176, the upper end of which carries a bevel gear 178 having constant mesh with a pair of sleeve gears 180 and 181 rotatably mounted on a shaft section 182 constituting one element or section of an elongated sectional shaft assembly 184 which extends along the front side of the machine and is nested within the confines of the front channel side rail 88.

The composite elongated shaft assembly 184 is comprised of a number of the shaft sections 182 arranged in alignment and operatively connected at adjacent ends by means of flexible connecting devices 186 (Fig. 17). Each shaft section 182 passes through the depending portions of a pair of angle brackets 188, secured as at 190 to the underneath side of the channel member or rail 88 and is rotatably journalled therein. The entire shaft assembly is adapted to be continuously rotated by a belt drive mechanism designated in its entirety at 192 (Fig. 5) in a manner that will be set forth in detail subsequently when the machine operating instrumentalities are described.

Still referring to Figs. 9 and 17, the sleeve gears 180 and 181 are normally non-rotating but are adapted to be selectively actuated under the control of a pair of clutch mechanisms 194 and 196 respectively, the former controlling the ascending movement of the platform assembly 54 and the latter controlling the descending movements thereof. Upon energization of the clutch 194, a drive is established from the constantly running shaft section 182 through the sleeve gear 180, bevel gear 178, shaft 176, gears 172, 174 and shaft 128 to the sprocket wheels 127 whereby the latter are rotated in a counterclockwise direction as viewed in Fig. 14 and the platform assembly 54 is thus elevated under the influence of the chain lengths 116. Upon energization of the clutch 196 a drive is established through a similar train of driving mechanisms including the sleeve gear 181 and the sprocket wheels 127 are rotated in a clockwise direction as viewed in Fig. 14 to cause lowering movement of the platform assembly.

As will be described in greater detail when the circuit diagram (Fig. 38) of the machine is set forth, the clutch assemblies 194 and 196 may be manually operated under the control of a pair of switch assemblies $S_1$ and $S_2$ respectively, which may be conveniently mounted in a common housing (not shown) affixed to the side rail 88. The clutch assembly 194 which controls the ascending movements of the platform assembly 54 may also be actuated periodically and automatically under the control of the stack level sensing mechanism 58 of Fig. 15 to impart periodic increments of upward movement to the platform assembly in conformity with the feed requirements of the suction devices 59.

Means are provided for deenergizing the clutch 196 when the platform assembly 54 has moved to the limit of its downward travel and, toward this end, a normally closed pair of contacts included in a switch assembly 199 (Figs. 11 and 38) may be mounted on a stationary part of the machine framework in the path of movement of the descending platform 54 so that upon engagement by the platform, the contacts become opened, thus opening the circuit for the solenoid clutch.

The stack level sensing mechanism

Referring now to Figs. 15 and 16, the means controlled by finger 56 for sensing the level of the uppermost sheet of paper in each stack comprises a vertically disposed strap 200, the lower end of which is partially curled around the transverse rod 140 as at 202 (Figs. 2 and 9) and the upper region of which has mounted thereon a box-like structure 204 (see also Fig. 11) including side walls 206 (Fig. 15) and a vertically disposed cover plate 208. The rotatable shaft 128 which carries the sprockets 127 passes through the side walls 206, and a supporting rod 210 also passes through these side walls and has its ends anchored in the opposed vertical side members 90. The previously mentioned sensing finger 56 is mounted on a horizontal rock shaft 212 rotatably carried at the free ends of a pair of throw-arms 214 the inner ends of which are secured on a second rock-shaft 216 mounted for rocking movement in the side walls 206. The finger 56 is offset laterally from the box-like structure 204 as shown in Fig. 16 and occupies a position slightly below the level of the gathering deck 52 and slightly above the level of the uppermost sheet in the stack when the stack is properly adjusted for feeding operations to the gathering deck. The shaft 212 carries a follower member 218 having a planar underneath surface 220 adapted to normally rest upon a knife edge 221 and to slide thereon when the rock shaft 212 is moved forwardly under the influence of the throw-arms 214. Means are provided for periodically actuating the rock-shaft 216 to swing the throw-arms 214 in a clockwise direction as viewed in Fig. 15 and thus move the shaft 212 forwardly to the dotted line position thereof, whereupon the follower 218 will ride horizontally forwardly on the knife edge 220 and extend the sensing finger forwardly so that the extreme end thereof overlies the stack of sheets on the platform assembly 54 as indicated by the dotted line position thereof. If the level of the uppermost sheet in the stack is at a predetermined proper level for efficient feeding purposes, the end of the finger 56 will come to rest on the top of the stack at the time that the rear edge of the surface 220 passes forwardly over the knife edge 221 and clears the same. On the other hand, if the level of the topmost sheet in the stack is below the predetermined level, the free end of the finger 56 will find no support on the stack at the time that the rear edge of the surface 220 passes the knife edge 221 and the finger will fall to the broken line position thereof, thus causing the follower 218 to engage actuator 224 of microswitch 222 through which solenoid clutch 194 is controlled as illustrated best in Fig. 38, to be described.

In order to periodically actuate the throw arms 214, one of the arms has formed thereon an offset ear 226 which is pivotally connected to one end of a link 228, the other end of the link being pivoted to the movable core 230 of a solenoid 232 operatively mounted within the structure 204. Upon energization of the solenoid 232 (see also Fig. 38), the core 230 thereof is retracted and the throw arm 214 is consequently swung about the axis of the rock shaft 216 as previously described to operate the sensing finger 56.

Energization of the solenoid is adpated to take place once during each machine cycle and, toward this end, as shown in Figs. 5 and 38, a motor driven transverse shaft 234 drives a cam 235 having a protuberance 236 thereon designed to close the contacts of a microswitch 238 once during each machine cycle and energize the circuit for the solenoid 232 as will be described in connection with the circuit diagram subsequently.

THE SHEET PICK-OFF AND DEPOSIT MECHANISM

The suction picker devices

Referring now to Figs. 8 to 12 inclusive, each suction bar assembly 60 includes a suction bar proper 250 which is of tubular design and rectangular in cross section as seen in Fig. 10. The ends of the bar are closed to provide a vacuum chamber 252 therein and air under sub-atmospheric pressure is periodically supplied to the chamber 252 through a flexible suction line 254 (Fig. 9) extending from a valve box 255 connected to a suction manifold 257 leading to a suitable source of low pressure. Supported on the suction bar 250 at spaced regions therealong are a series of suction boxes 256 having communication through flexible tubes 258 with the chamber 252 and one of the suction devices 59 is carried by each suction box and depends therefrom. Each suction device 59 is in the form of a suction tube having a flared lower end 260 providing, in effect, a suction cup of comparatively wide suction area and designed for engagement in the usual manner of such devices with the uppermost sheet of paper in the stack for paper lifting purposes.

The ends of the suction bar 250 are secured as at 262 to a pair of vertically movable heads 264 (Figs. 9 and 10) slidable in guideways afforded by vertically spaced pairs of rollers 266 mounted on opposed brackets 268 on opposite sides of the machine and carried by the guide rails 86 and 88 respectively. Each head 264 is formed with a rack 270 which meshes with a gear sector 272, the two gear sectors on opposite sides of the gathering deck being carried on a transverse shaft 274 extending across the machine between the heads 264. The shaft 274 projects completely through the head 264 at the back of the machine and carries thereon outside the confines of the bracket 268 a gear sector 276 which meshes with a rack segment 280 carried on an elongated reciprocable bar 282 which extends along the back side of the machine and is slidably supported on the side rail 86 as shown in Figs. 9 and 12. The bar 282 is common to all of the operating stations of the machine and it extends substantially coextensively with the side rail 86, there being one of the rack segments 280 at each station for operating the various suction devices. It will be seen that upon reciprocation of the bar 282, and consequently of the rack segments 280, vertical reciprocating motion will be applied to the racks 270 within the brackets 268 and consequently the suction bar 250 at each station will be raised and lowered in accordance with machine requirements and in timed relation to the movement of the other machine instrumentalities. Reciprocation of the bar 282 is effected by means of certain cam-operated driving mechanism associated with the machine operating instrumentalities and which will be described subsequently. The shaft 274 also has mounted thereon a sleeve 284 carrying another gear segment 286, the sleeve and segment constituting part of the operating mechanism for the back stop assembly 66 the nature of which likewise will be made clear presently.

The application of sub-atmospheric pressure to the suction line 254 at predetermined intervals is controlled by means of the valve box 255 (Figs. 9 and 12) which is formed with an internal passage 288 therein communicating with the suction manifold 257 and with a nipple 290 which in turn is connected to the line 254. A spool valve 292 is slidable in the valve box 255 and each spool valve at the various stations is connected to the spool valve at the next adjacent station by a connecting rod 294. One of the connecting rods 294, preferably the rearmost rod in the series, carries a fixed collar 296 thereon adapted to be alternately engaged by a pair of upstanding fingers 298 and 299 respectively fixedly secured in spaced relation to the reciprocable bar 282. As has previously been stated, the bar 282 is adapted to be reciprocated by the cam mechanism 80 yet to be described, and the nature of its reciprocation is such that suction will be applied to the suction line in timed relation to the movements of the various suction devices, all in a manner that will appear when the timing chart of Fig. 37 is made clear.

The detecting mechanism for sheet voids

Referring now to Figs. 9 and 10, in conjunction with the circuit diagram of Fig. 38, each suction bar 250 is connected by a flexible tube 254 to a vacuum gauge 302 of sensing apparatus 68 suitably supported on the machine framework 50 in the vicinity of its respective station, the gauge having associated therewith an actuating finger 303 which is movable from the retracted position shown in Figs. 10 and 38 to an advanced position wherein it operatively engages a micro-switch 304 and closes the normally open contacts thereof to operate certain relay mechanism subsequently to be described and by means of which the operation of the machine is terminated and a signal lamp energized. The finger 303 is normally maintain in its retracted position when a predetermined degree of vacuum is applied to the suction bar 250, thus indicating that the ends of the suction devices 59 are all closed by the presence of a sheet of paper thereacross. In the event that during any particular machine cycle the suction devices 59 fail to properly engage and lift a sheet from the stack, the suction chamber will not maintain a full head of subatmospheric pressure and the finger 303 will be moved to its advanced position to actuate the microswitch as previously described.

The detecting mechanism for sheet doubles

As best seen in Figs. 1, 10 and 11, at each station a pair of horizontal transverse rods 310 and 312 project across the gathering deck above the level thereof and have their ends supported by the opposed pair of brackets 268. Supported medially on the pair of rods 310 and 312 is a housing 314 (see also Fig. 13) including a base support 316 and a cover 317 therefor, the former being mounted by means of recessed ears 318 on the rods. The support includes an integral vertically extending front plate 320 the upper end of which has mounted thereon a signal lamp 322. An adjustable bracket 324 mounted on the base support 316 serves to support thereon a microswitch assembly 326 having an operating finger 328 projecting through an opening 330 in the front plate 320. The rear end of the base support 316 is curved downwardly as at 332 and projects forwardly to provide an offset shelf portion 334 designed for cooperation with the previously mentioned sensing or calipering element 70, the shelf portion 334 and element 70 both constituting elements of the paper thickness measuring mechanism 72.

Supported on the suction bar 250 in longitudinal alignment with the microswitch 326 is a depending bracket 336 which is generally U-shape in horizontal cross section and the lower end of which is formed with enlarged spaced rearwardly extending ears 338 between which the previously mentioned calipering element 70 is pivotally mounted. The lower end of the bracket 336 is formed with a downwardly facing horizontally extending gauging or backing surface 335 designed for cooperation with the calipering element 70 in determining the thickness of paper interposed between these two elements. The calipering element 70 includes a sensing finger proper 340 having an elongated shank 344 and a rearward extension 346 formed thereon. The element 70 is pivoted as at 348 between the ears 338 and the end of the shank portion 344 is designed for camming engagement with the lower end of a thrust finger 350 which is pivoted as at 351 medially of its ends as in the bracket 336. A spring 352 attached to one of the ears 338 and to the lower end of the thrust finger 350 normally urges the thrust finger in a counter-clockwise direction as viewed in Fig. 13 so that the extreme upper end thereof is out of vertical register with the switch finger 328.

The shelf portion 334 of the curved support 332 is in vertical alignment with the extension 346 on the calipering element 70 while the gauging surface 339 overlies the sensing finger proper 340. Thus it will be seen that upon vertical upward movement of the suction bar 250 so that the same approaches its extreme uppermost position, the extension 346 will engage the shelf portion 334 and swing the calipering element in a clockwise direction whenever the sensing finger 340 is advanced upon the gauging surface 339 so that it may engage the rear edge portion of a sheet of paper or the rear edge portions of plural sheets which may be held in elevated position by the suction elements 59 so as to gauge the thickness of the same. Where a single thickness of paper sheet is encountered, the upper end of the thrust finger 350 will remain out of vertical register with the switch-operating finger 358. However, where more than one thickness of the paper sheet is encountered by the sensing finger 340, the upper end of the thrust finger 350 will be moved into vertical register with the switch finger 328 so that when the suction bar 250 arrives at its extreme uppermost position, the thrust finger 350 will engage the switch finger 328 and actuate the switch 326 to close the contacts thereof as seen in Fig. 38 and actuate certain relay mechanism by means of which the operation of the machine is terminated and the signal lamp 322 energized. The lamp 322 is also capable of being energized under the influence of the sheet void detecting mechanism 68 as previously described.

*The riffling mechanism*

Means are provided for riffling or "fluffing" the rearmost edges of the sheets in the stack at each station of the machine by an aerating process wherein a jet or jets of air under pressure are blown against the stack in the vicinity of the pick-off mechanism so as to separate the individual sheets in this area and prevent sticking of the sheets to one another due to the generation of static electricity in the pile for example, or for other reasons. The previously mentioned aerating mechanism may take the form of an air manifold 360 (Fig. 9) at each station, having air expelling holes 361 therein for directing jets of air against the stack. The manifold 360 is supplied with air under pressure from an air compressor 362 associated with the machine operating instrumentalities at the rear end of the machine as will be described subsequently.

THE RECIPROCATING TRANSFER AND GATHERING MECHANISM

*The two-part rack assemblies*

Referring now to Figs. 3, 8, 9 and 18, the gathering deck 52 exists by virtue of the horizontal upper surfaces of the various rack assemblies 62 which occupy a common plane and which are reciprocable within such plane. As best seen in Fig. 9, the various racks which cooperate to make up the assemblies 62 are carried on two pairs of longitudinally reciprocable supporting bars which extend along the opposite or front and back sides of the machine respectively and each pair including an outer bar 402 and an adjacent inner bar 404. The bars are slidably and tractionally supported on freely rotating rollers 406 mounted on stub shafts 409 carried by the side rails 86 and 88 respectively. The bars 402 and 404 are common to all of the operating stations A, B, C, etc. and are coextensive therewith. The outer bars 402 serve to support the racks 62b while the inner bars 404 support the racks 62a.

As shown in Figs. 18 and 19, each rack 62a is comprised of a plurality of spaced parallel strips of flat sheet metal stock such as aluminum or steel providing an elongated flat bar 408 having a relatively wide rear region 410 and a relatively narrow front region 412 in the form of a forwardly extending finger which exists by virtue of a cut-away or relieved portion 414 on the underneath side of the bar. The medial region of the bar is formed with an elongated clearance slot 416, the purpose of which will appear presently, and with a pair of rectangular holes 418 adjacent the rear end thereof. The various bars 408 are operatively mounted in equally spaced parallel relation on a pair of carrier rods 420 which are of rectangular configuration in cross section and which pass through the various holes 418 and are suitably secured therein. The opposite ends of the rods 420 are secured to the opposed inner faces of the two outer reciprocable bars 402, a clearance slot 422 being provided in the inner bar 404 for passage therethrough of each pair of carrier rods 420.

The racks 62b are similar to the racks 62a and the various bars 408 which cooperate to make up the former rack are identical with the bars of the latter rack so that a detailed description of the same is not deemed to be necessary. The bars 408 of the rack 62b are supported on a pair of carrier rods 424 similar to the rods 420 and the direction of orientation of the bars 408 is reversed so that the finger portions 412 thereof project rearwardly. The carrier rods 424 pass beneath the finger portions 412 and through the clearance region 414 of the bars. The ends of the carrier rods 424 are secured to the opposed inner faces of the inner reciprocable rods 404.

The operation of the various racks 62a and 62b at the stations A, B, C, etc. will be set forth in detail when the operation of the machine is described and, for the present it is deemed necessary merely to state that at each station the two racks are movable at the commencement of each machine cycle from coexisting retracted positions wherein the racks 62a and 62b of each pair occupy the same longitudinal confines within their respective stations as approximately shown in Fig. 18, and as diagrammatically shown in Fig. 20, forwardly in unison throughout 180° of the machine cycle until such time as they completely underlie a paper sheet at the next succeeding station. By such simultaneous forward movement, the two racks do not change their relative position and the composite rack moves from its own station wholly into the next succeeding station as diagrammatically shown in Fig. 24. Thereafter, the rack 62a recedes while the rack 62b remains in a state of dwell and the rack 62a is restored to its fully retracted position at approximately 310° in the machine cycle. At approximately 230° in the cycle, the rack 62b recedes and is restored to its fully retracted position at the end of the machine cycle. Such movements of the various racks 62 are correlated with the movements of the back stop mechanism or assemblies 66 to effect the sheet-impelling functions as well as to effect the gathering operations, as will become clear when the nature of the back stop mechanism 66 is understood.

It should be noted at this point that the gathering deck location following the last operating station E at the discharge end of the machine is provided with only one rack assembly, namely the assembly 62a, the assembly 62b being unnecessary inasmuch as there is no succeeding station to receive the collated paper sheets. Instead the sheets may be deposited on an endless belt conveyor such as has been shown at 425 in Figs. 1, 3 and 4 associated with a separate table-like framework 427 and by means of which the collated sheets may be conducted from the machine. The conveyor 425 and its associated structure forms no part of the present machine and its disclosure herein is merely exemplary of one of a number of mechanisms which may be employed at the discharge end of the machine for receiving the gathered sheets. As best seen in Fig. 1, inasmuch as the gathering deck following station E does not include as a part of its rack assembly 62 the rack unit 62b, the reciprocating operating bar 404 which supports the various rack units 62b at the stations A to E, terminates in the juncture region between the pre-final and final racks 62, while the operating bar 402 continues to the final rack 62. If desired, to maintain the gathered sheets leaving the machine in their flat assembled condition, a pair of paper-engaging fingers 429 mounted on a transverse shaft 431 having its ends pivoted in a pair of brackets 433 supported on the frame members 86 and 88 at the rear of the machine are adapted to bear downwardly under the influence of gravity upon the gathered stack of sheets as it passes from the final rack 62 to the conveyor assembly 425.

*The back stop mechanisms*

Referring now to Figs. 11 and 11a, a rock shaft 450 has its ends rotatably journalled in the opposed brackets 268 at each station and extends transversely across the machine above the level of the gathering deck 52. At each station, there are two back stop assemblies 66, each including a back stop 64 shown in Fig. 1 for station E. At each assembly, a back stop 64 is pivotally mounted on a pin 452 eccentrically mounted on a strap 454 carried in the medial regions of the shaft 450. The back stop element 64 is in the form of an elongated finger having a forward vertical sheet engaging edge 456 from which there extends rearwardly a horizontal portion 458 which merges with an inclined portion 460, the latter terminating in a rearwardly curved portion 462 providing a cam surface designed for camming engagement with the underneath side of the transverse rod 312 which supports the base plate or support 316 of the paper thickness measuring mechanism 78. The rock shaft 450 is adapted to be periodically turned about its longitudinal axis throughout a limited degree of turning movement to cause the back stop element 64 to be swung downwardly from its extreme upper retracted position illustrated in Figs. 1, 20, and 21 to an initial lowered position wherein its vertical edge 456 (Fig. 11) is in abutting relationship to the rear edge of a sheet or pile of sheets undergoing gathering on the racks 62, and is thence moved forwardly to its extreme advanced lowered position (shown in Figs. 11 and 24 to 28) to advance the sheet or pile into the final deposit position of the station laterally out of the vertical path of the suction lifting members 59, in which position the stops 64 maintain the sheet or pile in the preliminarily advanced position against reverse movement with the return movement of the reciprocating racks 62. During movement of the back stop element 64 between its two extreme positions, the element is guided by virtue of its camming engagement between the arcuate portion 462 and the rod 312, the element being biased in a counter-clockwise direction as seen in Fig. 11 to effect such camming engagement by means of a spring and collar assembly 464 (Fig. 11) mounted on the pin 452.

As shown in Fig. 12, the rock shaft 450 projects completely through the back bracket 268 and carries at its end an arm 466 the free end of which has mounted thereon a follower roller 468 designed for camming engagement with a cam surface 470 formed on a cam block 472 mounted on a reciprocable bar 474 similar to the bar 282 and designed for longitudinal reciprocation on the side rail 90 alongside the reciprocable bar 282. The reciprocal movements of the two bars 474 and 282 are controlled by the cam actuating mechanism previously referred to and which will be described subsequently.

*The paper flattening assemblies*

As shown in Figs. 9, and 32 to 35 inclusive, the paper flattening instrumentalities 76 are in the form of a pair of paper guides which are mounted directly on the two outermost remote bars 408 respectively of each rack 62a and which are movable bodily therewith. The two guides are complemental in configuration, i.e., there being a back guide and a front guide and it is thought that a description of one will suffice for the other. Each guide comprises a sheet metal channel member 500 having a horizontal flange 502 and a vertical flange 504. Secured to the underneath side of the horizontal flange 502 is an inverted U-shape attachment member or clip 506 having depending side flanges 508 adapted to straddle and frictionally engage the outermost rack bar 408 of the rack 62a on one side of the machine. As shown in Fig. 9, when so mounted on the rack 62a, the horizontal flange 502 partially overlies the reciprocable bar 404 and it also overlies the extreme marginal regions of the rack assembly 62. Formed on the upper edge of the vertical flange 504 at the rear end thereof is an ear 510 which overlies the horizontal flange 502 and which is bent so as to present an inclined portion to which there are secured upper and lower spring strip steel guide fingers 512 and 514 respectively which are disposed in the same vertical plane. The upper finger 512 extends forwardly from the ear 510 and is curved as shown in Fig. 31. The lower finger 514 extends forwardly and downwardly and has a major portion thereof resting on the horizontal flange 502 of the angle piece 500. As shown in Fig. 31, the fingers 510 and 512 provide therebetween a rearwardly presented open pocket 516 into which the rear or trailing edge of each sheet of paper is adapted to slide when the sheet is first deposited on the gathering deck 52 and the rack assemblies 62 moves forwardly at the commencement of the machine cycle. The finger 512, in combination with the horizontal flange 502 of the channel 500 likewise presents a rearwardly facing open pocket 518 into which the leading edge of each pile of sheets is adapted to be impelled, relatively speaking, when the rack assembly 62a moves toward its retracted position, all in a manner that will be set forth during the description of the machine operation.

THE MACHINE OPERATING INSTRUMENTALITIES

*The belt drive mechanism for the stack elevating and lowering mechanism*

Referring now to Figs. 2, 5 and 6, the two rearmost vertical side members 90, in combination with side, end and cover panels 550, 552 and 554 respectively, provide a compartment like space in which the various machine operating instrumentalities are enclosed. Disposed within this space and suitably supported on a transverse base plate 556 is an electric motor $M_1$, one of the functions of which is to drive the elongated sectional shaft assembly 184. Accordingly, the motor $M_1$ is provided with a motor shaft 558 which carries a pulley 560 which is connected by a belt 561 in driving relationship to a second pulley 562 mounted on a short longitudinally extending shaft 564 rotatably carried in journal blocks 566 secured to the vertical frame members 90 at the operator's side of the machine at the rear end thereof. A third pulley 568 mounted on the shaft 564, and constituting an element of the previously mentioned belt drive mechanism 192, is operatively connected by a belt 569 to a pulley 570 carried on the rearmost section 182 of the shaft assembly 184. The sectional shaft assembly 184 is thus driven constantly from the motor $M_1$ and the rotation thereof is continuous. The shaft assembly 184, it will be remembered, is for the purpose of effecting automatic elevation and lowering of the platform assemblies 54.

The rack-reciprocating cam mechanism

Referring now to Figs. 5, 6, 7 and 36, the base plate 556 carries a second electric motor $M_2$ having a motor shaft 600 carrying a pulley 602 connected by a belt 604 to a second pulley 606 mounted on the input shaft 608 of a gear reduction device 610, having an output shaft 611. The output shaft 234 has mounted thereon a driving sprocket 612. Extending across the machine at the extreme rear end thereof and supported in the vertical side members 90 is a rod 614 carrying an idler sprocket 616. The gear reduction device 610 is supported on a cradle assembly 618 carried on the rod 614 and also on a similar rod 620 extending between the penultimate vertical members 90 of the framework 50. A stub shaft 622 mounted on the side of the cradle assembly 618 carries thereon a sprocket 624. A pair of longitudinally extending side plates 626 extend between the two rearmost side members 90 at the front and back of the machine and serve to support therebetween a horizontal rock shaft 628 (see also Fig. 36). The rock shaft 628 rotatably carries thereon a cam and sprocket assembly 630 including a hub or sleeve member 632 mounted on a bushing and on which there are secured a pair of cams 634 and 636 respectively and a sprocket 638. The previously mentioned transverse shaft 234 carries a sprocket 640 and constitutes the fifth sprocket of the series of sprockets including the sprockets 612, 624, 636 and 616. A chain 642 passes around all of these five sprockets in the manner clearly shown in Fig. 6.

Still referring to Figs. 5, 6, 7 and 36, rocking motion is imparted to the rock shaft 628 by means of a torque arm 644 (Fig. 7) connected at its lower end as at 646 to the rock shaft and the upper end of which is constrained to follow the movements imparted to it by a box cam and roller assembly 648 including a rotatable cam element 650 having a cam groove 652 therein and a cooperating cam roller 654 carried by the arm 644. The cam is driven from a shaft 656 operatively connected to the gear reduction device 610.

The rocking movements of the rock shaft 628 are applied directly to the reciprocable bar 402 which in turn imparts its movement to the rack assemblies 42b. Toward this end a lever 658 on each side of the machine has its lower end secured as at 660 to the rock shaft 626 and has its free end pivoted as at 662 (Fig. 6) to the extreme rear end of one of the reciprocable bars 402. The two levers 658, and consequently the two bars 402 are thus constrained to move in unison.

Extending between the spaced levers 658 and rotatably journalled in the same adjacent its pivoted ends is a transverse rock shaft 664. The shaft 664 is operatively connected in driving relation to the pair of inner reciprocable rack driving bars 404 by means of a pair of levers 666, the lower ends of these levers being secured as at 668 to the shaft 664 and the upper ends thereof being pivoted as at 670 to the bars. The levers 406 are capable of rocking motion relative to the levers 658 and a predetermined character of such rocking motion is imposed upon the levers 406 by means of the two cams 634 and 636 which, collectively, are confined between a pair of rocker arms 672 and 674 carrying cam engaging rollers 676 and 678 respectively and the inner ends of which are secured to the rock shaft 664. The rock shaft 664 is thus capable of movement bodily with the levers 658 to which they are pivotally attached, as well as being capable of interdependent rocking motion relative thereto. The character of motion applied to the reciprocable bars 402 and 404 by the cam arrangement just described will be set forth when the timing chart of Fig. 37 is described.

The cam mechanism for operating the picker device and the back stop

The picker device and back stop operating cam mechanism is best illustrated in Figs. 5 and 6 and is driven from the shaft 234. This mechanism includes a pair of cams 700 and 702 respectively, the former controlling the movements of the outer reciprocable bar 474 (see also Fig. 12) which actuates the back stop mechanism 66 and the latter controlling the movements of the outer reciprocable bar 282 which actuates the suction bar elevating mechanism. The cams 700 and 702 have associated therewith cam followers 704 and 706 respectively both of which are pivoted on a stub shaft 708 carried on the rearmost vertical frame member 90 and the upper ends of which are pivotally connected as at 710 and 712 to the rods 282 and 474 respectively. The character of movement imparted to the rods 282 and 474 by their respective cams will become apparent when consideration of the timing chart of Fig. 37 is given herein.

THE OPERATION OF THE MACHINE

The electrical circuits for the machine

Air under pressure and air under sub-atmospheric pressure for conduction to the suction devices 59 and air manifold 360 respectively may be supplied to the machine from independent sources of supply if desired, but, where a self-contained machine is contemplated, a combination suction pump and compressor unit 719 such as has been fragmentarily shown in Figs. 2 and 38 may be suitably mounted on the machine framework within the confines of the rear housing afforded by the various cover plates 550, 552 and 554. This unit may be driven from one of the motors $M_1$ or $M_2$, preferably the former and, toward this end, a belt drive mechanism 720 may be employed for this purpose.

It will be understood of course that for initial loading of the machine with stacks of paper sheets, the various platform assemblies 54 must be moved to their lowermost positions so that the stacks may be inserted through the openings afforded by the adjacent vertical side members 90 at the front side of the machine where the operator is stationed. Accordingly the operator will manipulate the switches $S_2$ at each of the five stations A, B, C, D and E as loading operations are commenced at each of these stations. Although only one of the five switches $S_2$ has been shown in the circuit diagram of Fig. 38, it will be understood that the diagram, in the main, is representative of the operation of the machine with respect to the control of only one of the five operating stations. A complete circuit diagram will include duplicate operating mechanism and duplicate circuitry therefor at each of the four other operating stations.

Upon closure of the switch $S_2$, an electric circuit will exist from the power line or source S through leads 51, 53, switch $S_2$, solenoid actuated clutch 196 and lead 57 back to the source. Energization of the clutch 196 will establish a driving connection between the shaft 181 and sleeve gear 182 and cause the shaft 128 (Fig. 9) to be driven in a direction to effect downward movement of the platform assembly 54 as previously described. After the platform 54 has been lowered, a stack of paper sheets is loaded on the tray proper and the switch $S_1$ is moved to its closed position to establish a circuit from the source through leads 51, 61, switch $S_1$, clutch 194 and lead 63 to the source. Energization of the clutch 194 will establish communication between the shaft 181 and sleeve gear 180 to rotate the shaft 128 in a direction to elevate the platform assembly 54. After the platform assembly 54 has been elevated to its approximate uppermost position the switch $S_1$ may be opened and automatic operation of the platform elevating mechanism will take place under the influence of the sensing instrumentalities 58 as previously described. Each time the normally open contacts $C_1$ of the microswitch 224 are closed by the follower member 218, a circuit is established through the clutch 194 so that a small increment of upward motion is applied to the platform assembly 54. The circuit exists from the source, through leads 51, 61, contacts $C_1$, clutch 194 and lead 63 to the source. The platform will thus be brought to its proper paper-presenting position with respect to the suction devices 59 and thereafter such automatic control will maintain the same at such level during the feeding of paper sheets to the gathering deck as previously described.

To effect automatic sensing of the level of the stack at the commencement of each machine cycle, the cam protuberance 236 (Figs. 5 and 38) on the cam 235 engages and closes the contacts $C_2$ of the microswitch 238 once during each machine cycle. Such periodic closure of the contacts $C_2$ establishes a circuit through the solenoid 323. This circuit extends from the source P through leads 67, 69, solenoid 232, lead 71, contacts $C_2$ and lead 73 to the source. Energization of the solenoid 232 operates the mechanism 58 in the manner previously described to cause periodic sensing of the stack level which, if at the proper height, will cause engagement of the uppermost sheet in the stack by the finger 56 so that closure of the contacts $C_2$ by the follower 218 will not take place and energization of the clutch 194 will be discontinued.

In the detection of sheet voids by the mechanism 68, when the suction line is bled to atmosphere by the absence of a sheet across the suction cups 260 (Fig. 9), the increase in pressure within the gauge device 302 (Fig. 10) will cause closure of the contacts $C_3$ of the microswitch 304. Closure of the contacts $C_3$ will establish a low voltage circuit through the secondary winding 75 of a transformer T having a primary winding 77 connected in a circuit extending from the source through leads 67, 79, winding 77, and lead 81 to the source. The local secondary circuit through the contacts $C_3$ extends from the winding 75 through lead 85, contacts $C_3$, lead 87, relay magnet $R_1$, normally closed manual stop switch $S_3$, and lead 89 back to the secondary winding 75. Energization of the magnet $R_1$ causes opening of a pair or normally closed contacts $C_4$ and closure of a pair of normally open contacts $C_5$. The contacts $C_4$ are disposed in the circuit for the electric motor $M_2$, this circuit extending from the source through lead 91, motor $M_2$, lead 93, contacts $C_4$, lead 95, a second stop switch $S_4$, lead 97, normally closed contacts $C_6$, and lead 99 to the source. Thus it will be seen that opening of the contacts $C_4$ will open the motor circuit and terminate the operation of the machine insofar as the operation of the reciprocating rack mechanism is concerned. Closure of the contacts $C_5$ will establish a low voltage circuit through the signal lamp 322 to indicate the source of the trouble. This circuit extends from the secondary winding 75 of the transformer through leads 111, 113, contacts $C_5$, leads 115, 117, lamp 322, and leads 119 and 121 to the secondary winding 75.

In the detection of sheet doubles by the mechanism 72 (Figs. 13 and 38), when the contacts $C_6$ of the microswitch 326 are closed by the finger 350 as previously described, a low voltage circuit will be established through a relay magnet $R_2$ and another circuit will be established through the signal lamp 322. The magnet circuit extends from the winding 75 through leads 111, 125, 127, magnet $R_2$, contacts $C_6$ and leads 129 and 121 to the winding 75. Energization of the magnet $R_2$ serves to open a pair of contacts $C_7$ and to close a pair of contacts $C_8$. The contacts $C_6$ are disposed in the circuit for the motor $M_1$ in series with the contacts $C_5$ as previously described and thus opening of either of these pairs of contacts will terminate the operation of the machine. The circuit through the signal lamp 322 extends from the winding 75 through leads 111, 125, 131, contacts $C_8$, leads 133, 117, lamp 322 and leads 119 and 121 to the winding 75.

The circuit for the motor $M_1$ is a direct current circuit and involves a rectifier 151 having input leads 153 and 155 connected to the source. The motor $M_2$, which drives the suction pump and compressor unit 719, is connected in a circuit leading from the output of the rectifier 151 and involving leads 157 and 159 respectively.

The mechanical operation of the machine

The above description of the electrical circuits for the machine and the operation of these circuits will lead to an understanding of the machine operation except insofar as the operation of the reciprocating rack mechanism is concerned. For an understanding of this latter mechanism, reference may be had to Figs. 18, 19 and 20 to 29 inclusive, as well as to the timing chart of Fig. 37.

The commencement of each machine cycle will be considered as taking place when the various rack assemblies 62 are in their fully retracted positions with the suction bars 250 lowered and with the suction devices 59 engaging the uppermost sheet of paper in each stack and with suction applied to the bars. This position is illustrated in Fig. 20 as relating to the operation of the mechanism at two adjacent stations, for example stations A and B adjacent the rear of the machine framework, with the illustrated suction and back stop devices 59 and 64 being those of station A. At this zero point in the machine cycle, each back stop 64 is in its raised position, and each suction device 59 has been moved downwardly through the associated space or gap between the racks 62, into suction pickup association with the top sheet of its supply stack.

As seen in Fig. 37, both racks $62a$ and $62b$ of each station move forwardly in unison and such movement is continued throughout 180° in the machine cycle. As the cycle commences, suction is applied to the devices 59 and air under pressure is applied to the riffling manifold 360 (Fig. 9). Additionally, the cycle is commenced by progressive elevation of the suction devices 59 which move above the level of the gathering deck 52 at approximately 45° in the cycle and become fully elevated at approximately 50°.

In Fig. 21, which represents the position of the parts at approximately 50° in the cycle, the suction devices 59 have become elevated. At this point, the racks $62a$ and $62b$ for each station have been moved in unison forwardly (to the left in the drawing) so that the forward edges thereof underlie the rear edge of the sheet which has been fully elevated by the suction devices 59 at that station.

In Fig. 22, which is taken at approximately 160°, both racks $62a$ and $62b$ of each station have moved forwardly to completely underlie the sheet of paper at that station which has not yet been released by the suction devices 59.

In Fig. 23, which is taken at approximately 180°, the racks $62a$ and $62b$ of each station are fully advanced and still in complete register or mesh with each other and they still underlie the sheet of paper, while suction has been discontinued at the suction devices 59 and these latter devices have moved downwardly a short distance (the latter motion occurring at approximately 140°) so that the sheet is released by the devices 59 and deposited on the gathering deck. The back stop 64 has, at this position of the parts, first moved downwardly to its initial downward position wherein the vertical edge 456 thereof (Fig. 11) just clears and assumes a position behind the trailing edge of the deposited sheet. Part 64 has also advanced to its extreme forward position (see also Fig. 11) to advance the deposited sheet to clear suction devices 59 at the station, which position part 64 maintains until near the end of the cycle (see Fig. 37) so that subsequent retraction of either rack $62a$ or $62b$, or of both racks, will not cause return of the sheet from one station to the next adjacent station.

In Fig. 24, which is taken at approximately 225° in the cycle, the rack $62a$ of station A has receded toward its retracted position while the associated rack $62b$ has remained in a state of dwell. No backward movement of the deposited sheet at station A will occur however inasmuch as the back stop 64 remains in its lowered advanced position during rack return.

In Fig. 25, which is taken at approximately 270° in the cycle, the recession of the rack 62a of station A has progressed and the associated rack 62b has also receded, with the recession being sufficiently advanced that the receding station-B rack 62a now overlaps the forward edge of the station-A rack 62b. Both racks 62a and 62b at each station are thus moving rearwardly and the deposited paper sheets are being held motionless by the lowered backstop 64.

In Fig. 26, which is taken at approximately 300° in the cycle, neither rack of any station has quite returned to its retracted position and the racks 62a of stations A and B are overlapped by rack 62b of station A, with the sheet raised at station A supported partly on the station-B rack 62a and partly on the station-A rack 62b.

In Fig. 27, which is taken at approximately 310° in the cycle each rack 62a is fully retracted and in its original position while the racks 62b are not yet in its fully retracted position. Separation of the rack assemblies 62 at stations A and B has begun to take place to create a void between the assemblies for subsequent entrance of the suction devices 59.

In Fig. 28, which is taken at approximately 330° in the machine cycle, both racks have been restored to their original positions of complete register and the suction devices remain fully elevated with the back stop 64 still engaging the rear or trailing edge of the sheet.

In Fig. 29, which is taken just prior to completion of the machine cycle, the suction devices have begun to descend on the next succeeding sheet to be transferred from the stack to the gathering deck 52 and the back stop has commenced to rise to make room for the subsequent advance of both racks 62a and 62b during the succeeding machine cycle.

The process described above in connection with Figs. 20 to 29 inclusive is repetitive and the succeeding forward motion of the racks 62a and 62b in unison at all operating stations will carry the sheets supported thereon from one station to the next station.

Referring again to Figs. 32 to 35 inclusive which disclose the details of the paper guide assembly 76, it will be remembered that, by virtue of the inverted U-shaped clips 508, these assemblies move bodily with the racks 62a to which they are fixedly attached. Thus it will be seen that as the two racks 62a and 62b move forwardly in unison during the first 180° in the machine cycle, the guide assemblies 76 advance upon the sheet which has been deposited on the gathering deck 52 and the pocket 516 provided by the two strips 510 and 512 progressively encompass the sheet. Upon staggered recession of the racks 62a and 62b, and specifically during retraction of the rack 62a to which the guide assembly 76 is attached, the pocket 518 afforded by the two strips will progressively encompass the sheet or pile of sheets contained in the gathered groups of sheets and maintain the same substantially flat on the surface of the gathering deck 52 against curling as previously described.

The invention is not to be limited to the exact arrangement of parts shown in the accompanying drawings or described in this specification as various changes in the details of construction may be resorted to without departing from the spirit of the invention. For example, while the various rack assemblies 62 has been shown herein as being comprised of intermeshing "slat" type units 62a and 62b respectively, it is to be distinctly understood that other forms of rack assemblies, such as imperforate sheet metal units which are capable of overlapping one another in their relative reciprocal movements, may be employed if desired. Similarly, the specific cam actuating mechanism 80 illustrated herein is purely exemplary and various other mechanisms may be employed for accomplishing the same relative movements of the various reciprocable rack bars 402 and 404 or of the reciprocable operating bars 282 and 474 if desired. Whereas mechanical means have been employed for controlling the application of sub-atmospheric pressure to the suction bar 250, it will be understood that electrically controlled cam operated relay mechanism may be designed to serve the purpose equally as well. Furthermore, although the machine illustrated herein is in the form of a collating machine for the gathering of sheets as described, suitable tipping mechanism such as has been schematically shown at 750 in Fig. 3 and which operates upon the principles set forth in Patent No. 2,371,179 dated March 13, 1945, and issued to J. C. Mendes, may be incorporated with the machine if desired and the gluing functions thereof coordinated with the reciprocation of the various rack assemblies 62 to apply glue to the sheets at or near the commencement of each machine cycle. Only insofar as the invention has particularly been pointed out in the accompanying claims is the same to be limited.

What is claimed is:

1. In a cyclicly operable horizontal collating machine having a plurality of operating stations arranged in horizontal alignment and in equally spaced relationship longitudinally of the machine, means at each station for supporting a stack of flat sheets of paper, means establishing a flat horizontal gathering deck common to and extending over the stacks in close proximity to the uppermost sheet in each stack and including a plurality of normally spaced horizontally reciprocable racks, one for each station, movable during each machine cycle in unison forwardly in the direction of paper feed from retracted positions wherein each rack overlies a stack in substantial vertical alignment therewith to advanced positions wherein each rack similarly overlies the next adjacent forward stack, similar pick-off and deposit mechanism at each operating station operative when the racks are in their retracted positions to engage the rear edge region of the uppermost sheet in the stack therebeneath and elevate the same above the level of the deck and to release such degree onto the deck when the rack at said station and the sheets thereon have moved beneath said edge and between the latter and the top of the stack and thus completed the elevation of the sheet, and a back stop at each station movable during each cycle from an elevated position above the level of the deck to a lowered position substantially at deck level and engageable with the trailing edges of the superimposed sheets on said deck for preventing rearward movement of the sheet during rearward movement of the rack.

2. In a cyclicly operable horizontal collating machine having a plurality of operating stations arranged in horizontal alignment and in equally spaced relationship longitudinally of the machine, means at each station for supporting a stack of flat sheets of paper, means establishing a flat horizontal gathering deck common to and extending over the stacks in close proximity to the uppermost sheet in each stack and including a plurality of normally spaced composite horizontally reciprocable racks, one for each station, each rack including a primary rack section and a secondary rack section means operable during each machine cycle for moving said sections in unison forwardly in the direction of paper feed from retracted positions wherein they are in register with each other and overlie a stack in substantial vertical alignment therewith to advanced positions wherein they are similarly in register with each other and overlie the next adjacent forward stack and for thereafter restoring said primary rack section to its retracted position while said secondary rack section remains in its advanced position to bridge the distance between the receding primary rack section and the next adjacent forward primary rack section and for finally restoring said secondary rack section to its retracted position, similar pick-off and deposit mechanism at each station operative when the rack sections are in their retracted positions to engage the rear edge of the uppermost sheet in the stack therebeneath and elevate the same above the level of the deck and to release such edge onto the deck when the rack sections and the sheets thereon have moved beneath said edge and between the latter and the top of the stack and thus completed the elevation of the sheet, and a back stop at each station movable during each cycle from an elevated position above the level of the deck to a lowered position substantially at deck level and engageable with the trailing edges of the superimposed sheets on said deck for preventing rearward movement of the sheets during rearward movement of the rack sections.

3. In a cyclicly operable horizontal collating machine having a plurality of operating stations arranged in horizontal alignment and in equally spaced relationship longitudinally of the machine, sheet feeding means at each station, means establishing a flat horizontal gathering deck common to and extending through each station and including a plurality of normally spaced horizontally reciprocable composite racks, one for each station, each rack including a primary rack section and a secondary rack section, means operable during each machine cycle for moving said sections in unison forwardly from retracted positions wherein they are in register with each other and with the sheet feeding means at said station to advanced positions wherein they are similarly in register with each other at the next adjacent forward station and for thereafter restoring said primary rack section to its retracted position while said secondary rack section remains in its advanced position to bridge the distance between the receding primary rack section and the next adjacent forward primary rack section and for finally restoring said secondary rack section to its retracted position, means operable when the rack sections are in their retracted positions for causing said sheet feeding means to move a sheet of paper into register with said composite rack for placement thereon, and a back stop at each station movable during each cycle from an elevated position above the level of the deck to a lowered position substantially at deck level and engageable with the trailing edges of the superimposed sheets on the deck for preventing rearward movement of the sheets during rearward movement of the rack sections.

4. In a cyclicly operable horizontal collating machine having a plurality of operating stations arranged in horizontal alignment and in equally spaced relationship longitudinally of the machine, means at each station for supporting a stack of flat sheets of paper, means establishing a flat horizontal gathering deck common to and extending over the stacks in close proximity to the uppermost sheet in each stack and including a plurality of normally spaced horizontally reciprocable racks, one for each station, movable during each machine cycle in unison forwardly in the direction of paper feed from retracted positions wherein each rack overlies a stack in substantial vertical alignment therewith to advanced positions wherein each rack similarly overlies the next adjacent forward stack, similar pick-off and deposit mechanism at each operating station normally positioned above the level of said deck and operative when the racks are in their retracted positions to descend through the space existing between adjacent racks and engage the rear edge of the uppermost sheet in the stack therebeneath and elevate the same through said space to a level above the level of the deck and to release such edge onto the deck when the rack at said station and the sheets thereon have moved beneath said edge and between the latter and the top of the stack and thus completed the elevation of the sheet, and a back stop at each station movable during each cycle from an elevated position above the level of the deck to a lowered position substantially at deck level and engageable with the trailing edges of the superimposed sheets on said deck for preventing rearward movement of the sheet during rearward movement of the rack.

5. In a cyclicly operable horizontal collating machine having a plurality of operating stations arranged in horizontal alignment and in equally spaced relationship longitudinally of the machine, means at each station for supporting a stack of flat sheets of paper, means establishing a flat horizontal gathering deck common to and extending over the stacks in close proximity to the uppermost sheet in each stack and including a plurality of normally spaced composite horizontally reciprocable racks, one for each station, each rack including a primary rack section and a secondary rack section means operable during each machine cycle for moving said sections in unison forwardly in the direction of paper feed from retracted positions wherein they are in register with each other and overlie a stack in substantial vertical alignment therewith to advanced positions wherein they are similarly in register with each other and overlie the next adjacent forward stack and for thereafter restoring said primary rack section to its retracted position while said secondary rack section remains in its advanced position to bridge the distance between the receding primary rack section and the next adjacent forward primary rack section and for finally restoring said secondary rack section to its retracted position, said primary and secondary rack sections each comprising a plurality of transversely spaced, parallel extending bars, spacer means maintaining said bars in their spaced parallel relation and movable bodily with the bars, the bars of each primary rack section and its respective secondary rack section intermeshing with each other in transverse alternation when the rack sections are in partial or full register, similar pick-off and deposit mechanism at each station operative when the rack sections are in their retracted positions to engage the rear edge of the uppermost sheet in the stack therebeneath and elevate the same above the level of the deck and to release such edge onto the deck when the rack sections and the sheets thereon have moved beneath said edge and between the latter and the top of the stack and thus completed the elevation of the sheet, and a back stop at each station movable during each cycle from an elevated position above the level of the deck to a lowered position substantially at deck level and engageable with the trailing edges of the superimposed sheets on said deck for preventing rearward movement of the sheets during rearward movement of the rack sections.

6. In a cyclicly operable horizontal collating machine having a plurality of operating stations arranged in horizontal alignment and in equally spaced relationship longitudinally of the machine, means at each station for supporting a stack of flat sheets of paper, means establishing a flat horizontal gathering deck common to and extending over the stacks in close proximity to the uppermost sheet in each stack and including a plurality of normally spaced composite horizontally reciprocable racks, one for each station, each rack including a primary rack section and a secondary rack section means operable during each machine cycle for moving said sections in unison forwardly in the direction of paper feed from retracted positions wherein they are in register with each other and overlie a stack in substantial vertical alignment therewith to advanced positions wherein they are similarly in register with each other and overlie the next adjacent forward stack and for thereafter restoring said primary rack section to its retracted position while said secondary rack section remains in its advanced position to bridge the distance between the receding primary rack section and the next adjacent forward primary rack section and for finally restoring said secondary rack section to its retracted position, said primary and secondary rack sections each comprising a plurality of longitudinally extending flat bars, a spacer element secured to and connecting each pair of adjacent bars for maintaining the same in spaced parallel relation and movable bodily with its respective rack section, the bars of each primary rack section and its respective secondary rack section intermeshing with each other in transverse alternation when the rack sections are in partial or full register, the material of each bar of each section which is intermediate adjacent bars on the other section being relieved to provide a clearance for the spacer element connecting said adjacent sections, similar pick-off and deposit mechanism at each station operative when the rack sections are in their retracted positions to engage the rear edge of the uppermost sheet in the stack therebeneath and elevate the same above the level of the deck and to release such edge onto the deck when the rack sections and the sheets thereon have moved beneath said edge and between the latter and the top of the stack and thus completed the elevation of the sheet, and a back stop at each station movable during each cycle from an elevated position above the level of the deck to a lowered position substantially at deck level and engageable with the trailing edges of the superimposed sheets on said deck for preventing rearward movement of the sheets during rearward movement of the rack sections.

7. In a cyclicly operable horizontal collating machine, the combination set forth in claim 6 wherein all of said flat bars are substantially identical in configuration with the bars of said primary rack section being reversely oriented longitudinally of the composite racks whereby said primary rack sections and said secondary rack sections may be assembled from identical preformed rack bar stock.

8. In a cyclicly operable horizontal collating machine having a plurality of operating stations arranged in horizontal alignment and in equally spaced relationship longitudinally of the machine, means at each station for supporting a stack of flat sheets of paper, means establishing a flat horizontal gathering deck common to and extending over the stacks in close proximity to the uppermost sheet in each stack and including a plurality of normally spaced horizontally reciprocable racks, one for each station, movable during each machine cycle in unison forwardly in the direction of paper feed from retracted positions wherein each rack overlies a stack in substantial vertical alignment therewith to advanced positions wherein each rack similarly overlies the next adjacent forward stack, similar pick-off and deposit mechanism at each operating station operative when the racks are in their retracted positions to engage the rear edge region of the uppermost sheet in the stack therebeneath and elevate the same above the level of the deck and to release such edge onto the deck when the rack at said station and the sheets thereon have moved beneath said edge and between the latter and the top of the stack and thus completed the elevation of the sheet, calipering means at each station for measuring the thickness of rear edge region of the elevated sheet, means operable when the thickness of paper measured by said calipering means exceeds a predetermined thickness for closing a work circuit, and a back stop at each station movable during each cycle from an elevated position above the level of the deck to a lowered position substantially at deck level and engageable with the trailing edges of the superimposed sheets on said deck for preventing rearward movement of the sheet during rearward movement of the rack.

9. In a cyclicly operable horizontal collating machine having a plurality of operating stations arranged in horizontal alignment and in equally spaced relationship longitudinally of the machine, an electric motor controlling the operation of said machine, an electric circuit for the motor, means at each station for supporting a stack of flat sheets of paper, means establishing a flat horizontal gathering deck common to and extending over the stacks in close proximity to the uppermost sheet in each stack and including a plurality of normally spaced horizontally reciprocable racks, one for each station, movable during each machine cycle in unison forwardly in the direction of paper feed from retracted positions wherein each rack overlies a stack in substantial vertical alignment therewith to advanced positions wherein each rack similarly overlies the next adjacent forward stack, similar pick-off and deposit mechanism at each operating station operative when the racks are in their retracted positions to engage the rear edge region of the uppermost sheet in the stack therebeneath and elevate the same above the level of the deck and to release such edge onto the deck when the rack at said station and the sheets thereon have moved beneath said edge and between the latter and the top of the stack and thus completed the elevation of the sheet, a downwardly facing backing surface at each station positioned slightly above the level of the elevated sheet, a calipering finger movable from a retracted position to an operative extended position wherein it engages the underneath side of the elevated paper material and forces the same against said backing surface to measure the thickness of the material, means for moving said finger to its advanced position during each machine cycle, relay means operable when energized for opening said motor circuit and including a relay circuit having a pair of normally open contacts disposed therein, a thrust finger operatively connected to said calipering finger and operable to close said contacts when the thickness of paper material measured by said finger exceeds a predetermined thickness, and a back stop at each station movable during each cycle from an elevated position above the level of the deck to a lowered position substantially at deck level and engageable with the trailing edges of the superimposed sheets on said deck for preventing rearward movement of the sheet during rearward movement of the rack.

10. In a cyclicly operable horizontal collating machine having a plurality of operating stations arranged in horizontal alignment and in equally spaced relationship longitudinally of the machine, means at each station for supporting a stack of flat sheets of paper, means establishing a flat horizontal gathering deck common to and extending over the stacks in close proximity to the uppermost sheet in each stack and including a plurality of normally spaced horizontally reciprocable racks, one for each station, movable during each machine cycle in unison forwardly in the direction of paper feed from retracted positions wherein each rack overlies a stack in substantial vertical alignment therewith to advanced positions wherein each rack similarly overlies the next adjacent forward stack, similar pick-off and deposit mechanism at each station and including a plurality of transversely spaced suction tubes having open sheet-engaging ends normally positioned above the level of said gathering deck and movable in unison during each machine cycle when the rack is in its retracted position downwardly through the gathering deck in advance of the retracted rack and into engagement with the rear edge region of the uppermost sheet of paper in the stack and thereafter movable upwardly to its retracted position while the rack is still retracted to elevate said edge region above the level of the deck, a suction manifold common to said suction tubes and movable bodily therewith through the range of vertical movement thereof, a vacuum gauge fixedly mounted at each station, a flexible conduit establishing communication between the vacuum gauge and suction manifold, a work circuit including a pair of normally open contacts in the vicinity of each vacuum gauge, and an operating finger carried by each gauge and movable into engagement with said normally open contacts to close the same when the pressure registered by the gauge exceeds a predetermined maximum.

11. A cyclically operable collating machine comprising means establishing a series of operating stations uniformly spaced along the machine in horizontal alignment, means for supporting a separate supply of sheets for each station, a horizontal gathering rack having a retracted position in which it extends along the machine to the last station from a location preceding the first station of the series, the gathering rack having a forward position in which it is located horizontally forward of its said retracted position a distance approximating the distance between stations, means for advancing and returning the rack longitudinally between its said positions in regularly recurring cycles, sheet-deposit means at each station for depositing onto the gathering rack thereat sheets of paper in succession from the said supply for that station, means for causing the sheet-deposit means to operate in unison with the said rack movements to effect the deposit of a sheet onto the rack at each station each time the rack reaches its said forward position, holding means at each station for holding the sheet currently deposited thereat against following the next succeeding return movement of the rack while leaving the sheet free to move forwardly with the rack upon the next forward movement thereof, whereby such forward movement of the rack advances the deposited sheets, the last deposited sheet of any station preceding the last being thereby advanced to the next station of the series in a position to be overlaid by the next sheet deposited thereat.

12. A cyclically operable collating machine according to claim 11, wherein the distance between the said retracted and advanced positions of the said rack may be at least a given distance less than the distance between adjacent ones of said stations, the said holding means at each station including stop means movable into and out of the path of the sheets along the rack, means for moving the stop means at any station into the sheet path just behind the sheet newly deposited thereat and for thereupon moving the stop means forward to slide the newly deposited sheet forward through said given distance, the said stop means serving at any station succeeding the first to align the rear edge of the sheets of the stack thereat which includes the local newly deposited sheet and the sheet deposited at the preceding station during the preceding machine cycle.

13. A cyclically operable collating machine according to claim 11, wherein the said rack has a separate transverse gap for each station which is open during the said forward movements of the rack, the said sheet-supporting means comprising means for supporting a separate sheet supply for each station located below the rack, the said sheet-deposit means comprising means at each station for raising a sheet through the associated gap in the rack during the forward rack movement and for depositing such sheet on the rack at the end of the forward rack movement at a location on the rack to the rear of the gap through which the sheet is raised, whereby the said gap passes underneath the deposited sheet on the next succeeding return movement of the rack, and gap-bridging means and means for operating it during each return movement of the rack to bridge the said gaps to provide continuous support of the deposited sheets during rack-return movement.

14. A cyclically operable collating machine according to claim 13, wherein the said gap-bridging means for any said gap comprises a rack portion telescopable longitudinally with an associated inter-gap portion of the rack and moved with the rack and relative to the rack by the said rack-moving means.

References Cited in the file of this patent

UNITED STATES PATENTS

| | | |
|---|---|---|
| 2,145,520 | McFarlane | Jan. 31, 1939 |
| 2,172,519 | Reeder | Sept. 12, 1939 |
| 2,362,134 | Honig | Nov. 7, 1944 |
| 2,373,746 | Dager | Apr. 17, 1945 |
| 2,568,224 | Didde et al. | Sept. 18, 1951 |
| 2,753,180 | Thomas | July 3, 1956 |
| 2,801,846 | Stoothoff et al. | Aug. 6, 1957 |
| 2,846,214 | Didde et al. | Aug. 5, 1958 |

UNITED STATES PATENT OFFICE
CERTIFICATE OF CORRECTION

Patent No. 2,982,542  May 2, 1961

Richard H. Colwill

It is hereby certified that error appears in the above numbered patent requiring correction and that the said Letters Patent should read as corrected below.

Column 1, line 48, for "issociated" read -- associated --; column 7, line 2, for "364" read -- 52 --; line 3, for "74" read -- 364, 361 (Fig. 9) --; same column 7, line 58, for "though" read -- thought --; column 15, lines 69 and 70, for "(Fig. 11)" read -- (Fig. 11A) --; column 19, line 16, for "323" read -- 232 --; column 21, line 21, after "cycle" insert a comma; column 22, line 42, for "degree" read -- edge --.

Signed and sealed this 19th day of September 1961.

(SEAL)
Attest:

ERNEST W. SWIDER
Attesting Officer

DAVID L. LADD
Commissioner of Patents

USCOMM-DC